(12) United States Patent
Ergican et al.

(10) Patent No.: US 10,470,605 B2
(45) Date of Patent: Nov. 12, 2019

(54) SINGLE-SERVING BEVERAGE MACHINE WITH HIGH-CAPACITY AND COMPACT COOLING-CARBONATION SYSTEM

(71) Applicant: WHIRLPOOL CORPORATION, Benton Harbor, MI (US)

(72) Inventors: Erdogan Ergican, St. Joseph, MI (US); Sann Naing, St. Joseph, MI (US); Rodrigo Dos Santo Rengel, Stevensville, MI (US); Sergio Luis Da Silva, St. Joseph, MI (US); Andre Goncalez Ribeiro, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 15/953,577

(22) Filed: Apr. 16, 2018

(65) Prior Publication Data

US 2018/0303275 A1  Oct. 25, 2018

Related U.S. Application Data

(60) Provisional application No. 62/488,446, filed on Apr. 21, 2017.

(51) Int. Cl.
| | |
|---|---|
| *B01F 3/00* | (2006.01) |
| *A47J 31/40* | (2006.01) |
| *B67D 1/00* | (2006.01) |
| *B01F 3/04* | (2006.01) |
| *A23L 2/395* | (2006.01) |

(Continued)

(52) U.S. Cl.
CPC ............... *A47J 31/407* (2013.01); *A23F 3/30* (2013.01); *A23F 5/36* (2013.01); *A23L 2/395* (2013.01); *B01F 3/04794* (2013.01); *B01F 7/00633* (2013.01); *B01F 13/089* (2013.01); *B01F 13/0872* (2013.01); *B67D 1/0071* (2013.01); *B67D 1/0073* (2013.01); *F25B 25/005* (2013.01); *F25B 2700/21171* (2013.01)

(58) Field of Classification Search
CPC .. B67D 1/0071; B67D 1/0072; B67D 1/0073; B01F 3/04794
USPC .................................... 99/323.2, 323.1, 290
See application file for complete search history.

(56) References Cited

U.S. PATENT DOCUMENTS

| | | | | |
|---|---|---|---|---|
| 2,328,110 A | * | 8/1943 | Thompson ........... | B67D 1/0016 222/129.1 |
| 2,536,400 A | * | 1/1951 | Thompson ............ | B67D 1/105 222/129 |

(Continued)

*Primary Examiner* — Reginald Alexander
(74) *Attorney, Agent, or Firm* — Nyemaster Goode, P.C.

(57) ABSTRACT

A beverage machine system that includes: an insulated potable liquid storage tank having an interior volume; a liquid carbonator spaced within the interior volume of the insulated potable liquid storage tank and submerged therein; a high pressure potable liquid pump configured to pump potable liquid from the interior volume of the insulated potable liquid storage tank through a potable liquid conduit to a spray nozzle within an interior volume of the liquid carbonator; and a cooling coil positioned in a spaced apart relationship but wound around the carbonator such that the cooling coil does not physically touch an exterior surface of the carbonator submersed within the chilled potable liquid and the space between the cooling coil and the carbonator is at least substantially free of any other structure other than periodic frozen potable liquid adjacent the cooling coil.

14 Claims, 34 Drawing Sheets

(51) Int. Cl.
*A23F 3/30* (2006.01)
*A23F 5/36* (2006.01)
*F25B 25/00* (2006.01)
*B01F 7/00* (2006.01)
*B01F 13/08* (2006.01)

(56) References Cited

U.S. PATENT DOCUMENTS

| | | | |
|---|---|---|---|
| 2,655,858 A * | 10/1953 | Hamlin | B67B 7/28 |
| | | | 194/240 |
| 8,836,956 B2 | 9/2014 | Jarisch et al. | |
| 8,945,374 B2 | 2/2015 | Chase | |
| 8,985,395 B2 | 3/2015 | Tansey | |
| 9,255,819 B2 | 2/2016 | Jarisch et al. | |
| 9,272,892 B2 | 3/2016 | Kuehl et al. | |
| 9,282,848 B2 | 3/2016 | Weijers et al. | |
| 9,346,611 B1 | 5/2016 | Roberts et al. | |
| 9,474,406 B2 | 10/2016 | Smith et al. | |
| 9,487,348 B2 | 11/2016 | Roberts et al. | |
| 2002/0060226 A1 * | 5/2002 | Kameyama | B67D 1/0037 |
| | | | 222/1 |
| 2013/0114089 A1 | 5/2013 | Jarisch et al. | |
| 2013/0233180 A1 * | 9/2013 | Belmont | A47J 31/407 |
| | | | 99/323.2 |
| 2014/0239521 A1 * | 8/2014 | Ergican | B67D 1/0058 |
| | | | 261/115 |
| 2014/0263413 A1 * | 9/2014 | Green | B67D 1/0888 |
| | | | 222/1 |
| 2015/0034674 A1 | 2/2015 | Hertensen | |
| 2015/0110931 A1 | 4/2015 | Chase | |
| 2015/0151956 A1 | 6/2015 | Tansey | |
| 2015/0183627 A1 | 7/2015 | Tansey, Jr. | |
| 2015/0217986 A1 | 8/2015 | Tansey, Jr. | |
| 2016/0106136 A1 * | 4/2016 | Gordon | A47J 31/407 |
| | | | 426/477 |
| 2016/0194148 A1 | 7/2016 | Weijers et al. | |
| 2016/0251208 A1 | 9/2016 | Tansey, Jr. | |
| 2016/0280527 A1 | 9/2016 | Griscik et al. | |
| 2016/0288988 A1 | 10/2016 | Roberts et al. | |
| 2016/0318689 A1 | 11/2016 | Rudick et al. | |

* cited by examiner

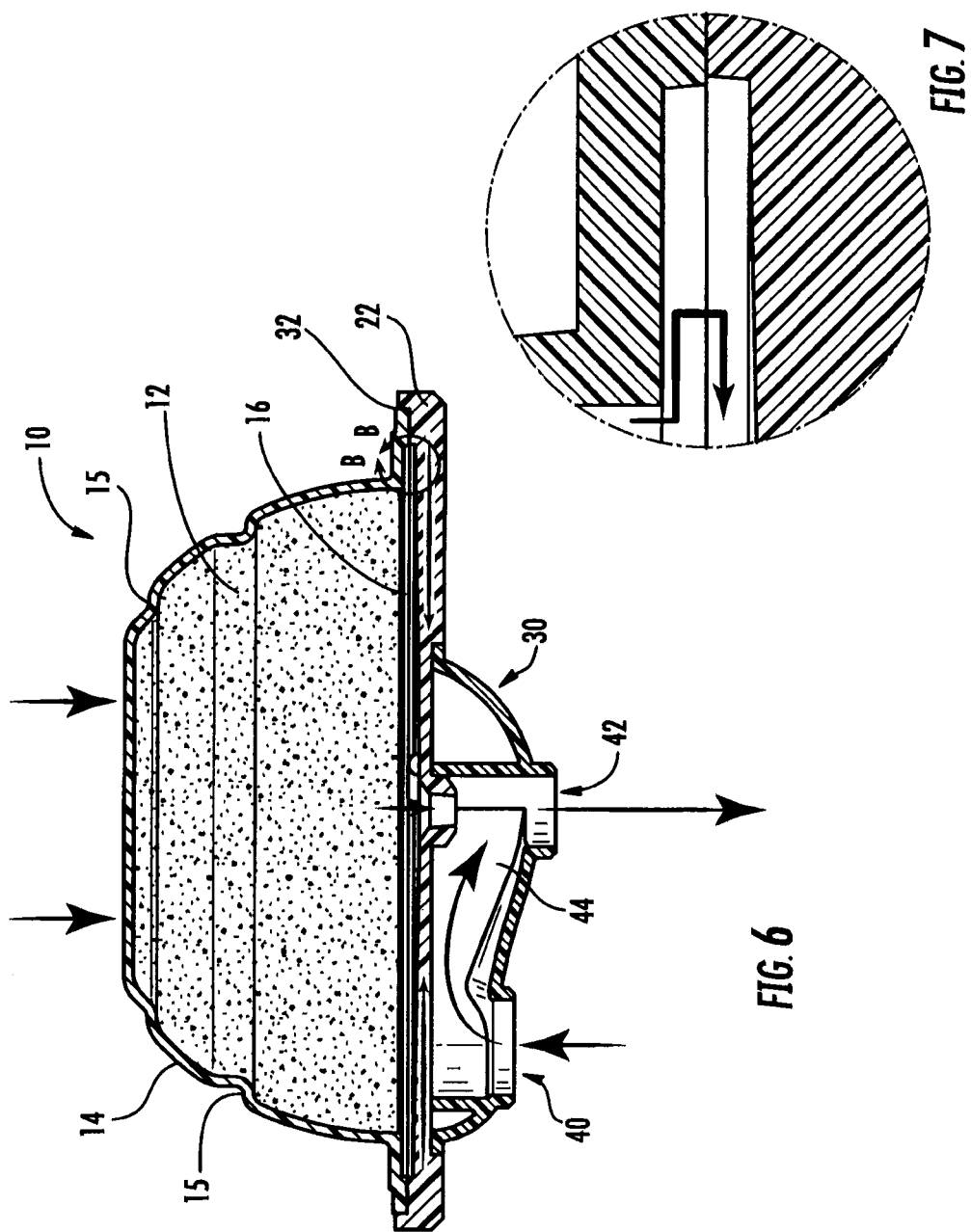

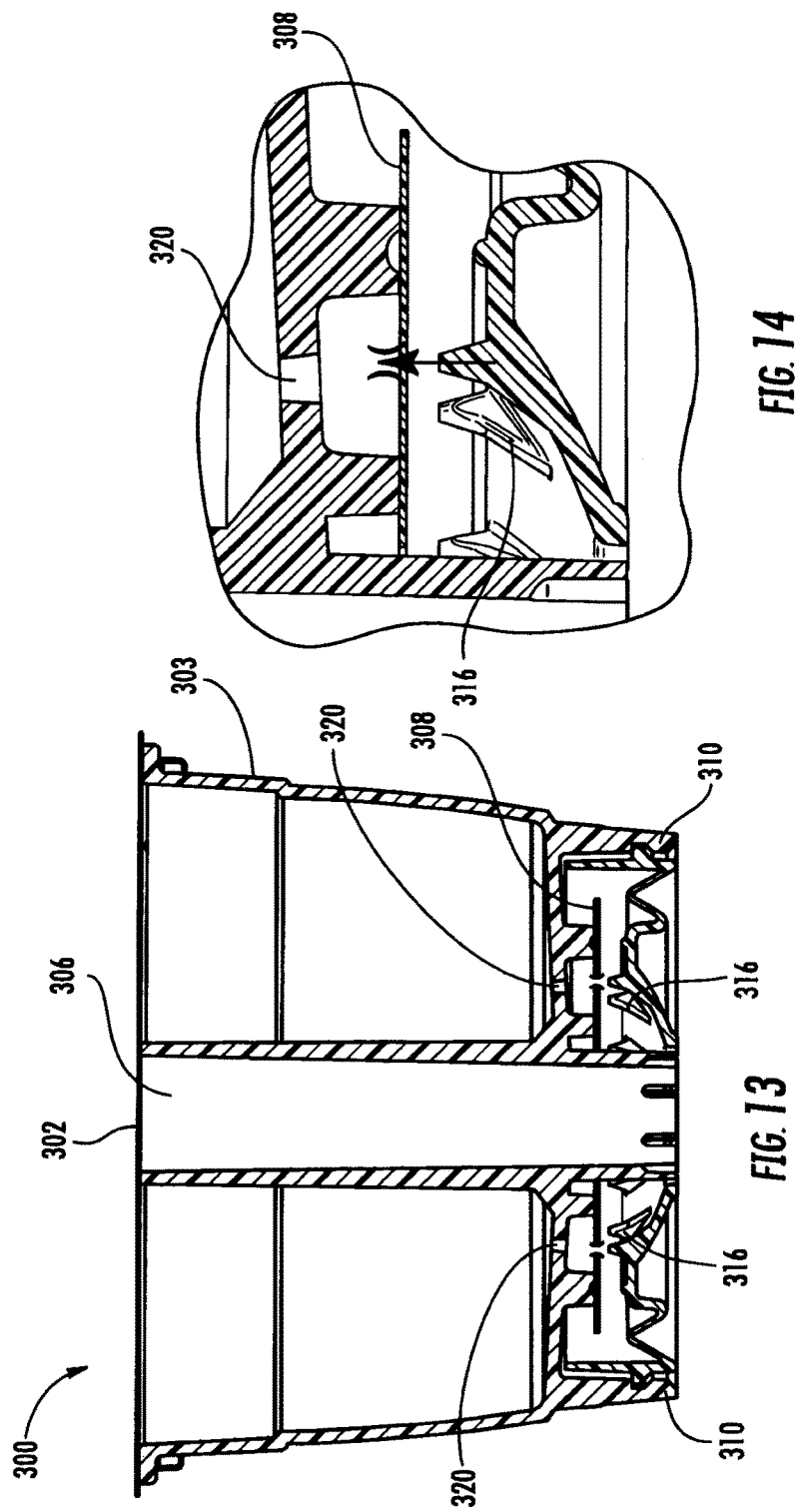

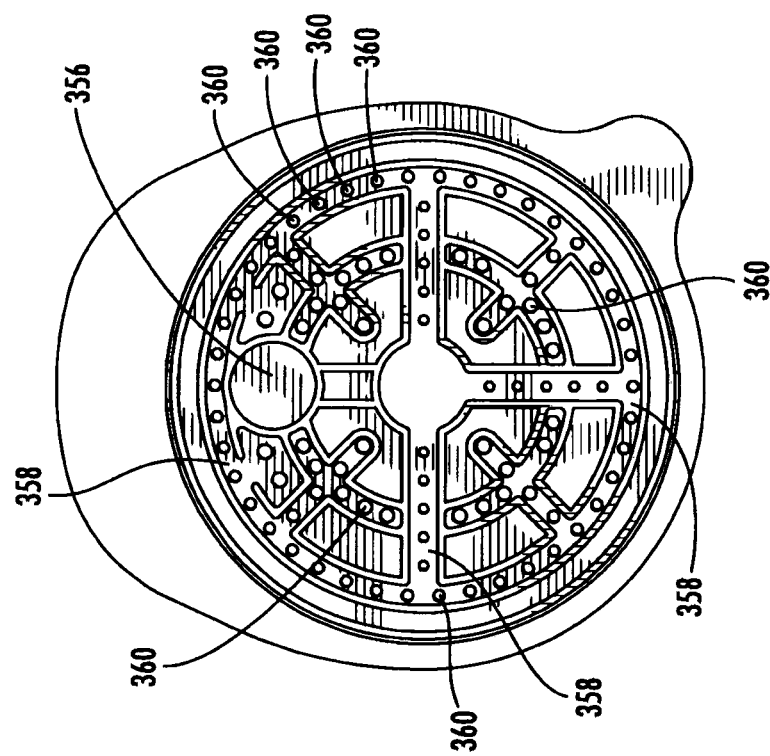
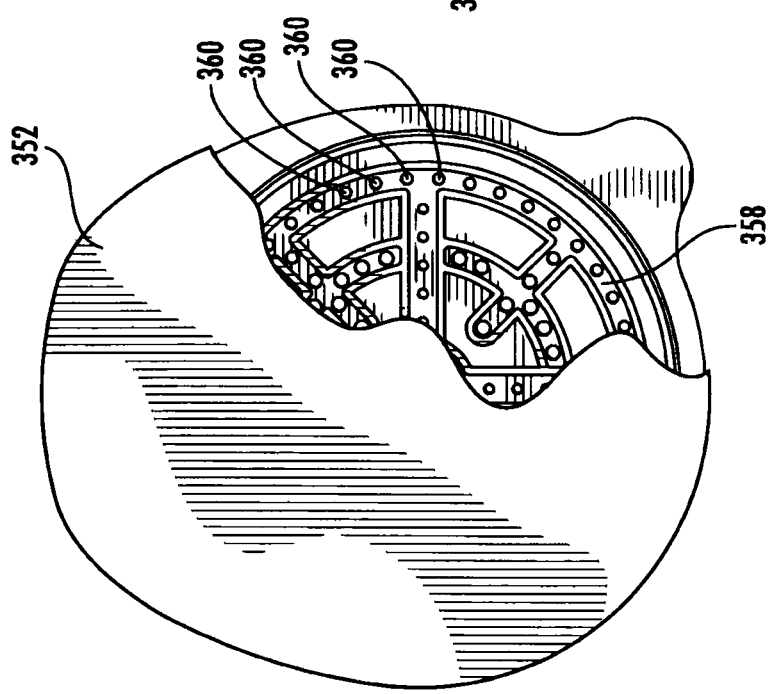

SINGLE-SERVING BEVERAGE MACHINE WITH HIGH-CAPACITY AND COMPACT COOLING-CARBONATION SYSTEM

CROSS-REFERENCE TO RELATED APPLICATIONS

This application claims priority to U.S. Provisional Application No. 62/488,446, filed on Apr. 21, 2017, entitled "Single-Serving Beverage Machine with High-Capacity and Compact Cooling-Carbonation System," the disclosure of which is hereby incorporated herein by reference in its entirety.

BACKGROUND

Single-serve beverages have become increasingly popular in the last few years. While concentrated drink mixes have been available to consumers for years, more recently, products providing hot, filtered coffee and tea from a single-serve container are becoming increasingly popular. These products are often produced using a machine that can pierce the single-serve container at the top and bottom, and then feed hot water through the container to create the hot beverage.

One type of single-serve container is as simple as providing a concentrate in a container or sleeve with only enough concentrate for a single use. The concentrate, which most often come in a dry powder or granular form, can then be manually mixed with hot water to create the hot beverage. Such containers have several disadvantages, including lower quality taste and the need for a separate device to provide boiling or hot water.

Powders and other concentrates are also available to provide cold drinks. These products are also available in single-serve and multiple serving sized containers. The products typically come in a dry powder, but liquid concentrates are also available. However, these products are undesirable because after manual mixing with water, the concentrate is often left incompletely or non-uniformly distributed, negatively affecting taste and texture.

A third type of self-serve container is the KEURIG® type capsule that is made to be used in a specific machine. The capsules contain concentrate, tea, or coffee grounds and have a filter at the outlet end. The machine punctures these single-serving containers at the top and bottom, then water flows through the capsule to make the beverage. This type of container requires the machine to mechanically puncture the capsule, which may be unsanitary. Also, the KEURIG® type of single-serving container does not guarantee good mixing control or sealing between the device and the capsule.

SUMMARY

One aspect of the present disclosure includes a single-serve capsule that may be used in a device to produce a hot or cold beverage. Hot or cold water may flow into and out of the capsule through an inlet and then an outlet to make the beverage. The capsule may be self-piercing, such that no piece of the device enters or directly punctures the capsule. Instead, pressure on the capsule may cause designed weak points to break, creating an inlet and an outlet.

These and other aspects, objects, and features of the present disclosure will be understood and appreciated by those skilled in the art upon studying the following specification, claims, and appended drawings.

An aspect of the present disclosure includes a beverage machine system having: an insulated potable liquid storage tank having an interior volume defined by one or more potable liquid retaining surfaces and retaining a chilled potable liquid within the interior volume at about ice bath temperature; a liquid carbonator spaced within the interior volume of the insulated potable liquid storage tank and submerged therein and the liquid carbonator is in fluid communication with a pressurized carbon dioxide source tank via a carbon dioxide supply conduit; a high pressure potable liquid pump configured to pump potable liquid from the interior volume of the insulated potable liquid storage tank through a potable liquid conduit to a spray nozzle within an interior volume of the liquid carbonator such that carbon dioxide is supplied at a carbon dioxide pressure from the carbon dioxide tank and carbonation occurs as potable water is delivered to the interior of the liquid carbonator by utilizing the high pressure potable liquid pump and wherein the high pressure potable liquid pump delivers the potable liquid from the interior of the insulated potable liquid storage tank at a variable, but increasing pressure via the spray nozzle at a pressure greater than the carbon dioxide pressure throughout the process of carbonating the water in the liquid carbonator; and a cooling coil positioned in a spaced apart relationship but wound around the carbonator such that the cooling coil does not physically touch an exterior surface of the carbonator submersed within the chilled potable liquid and the space between the cooling coil and the carbonator is at least substantially free of any other structure other than possible periodic frozen potable liquid adjacent the cooling coil.

Yet another aspect of the present disclosure is directed to a single serving beverage machine system that includes: an insulated potable liquid storage tank having an interior volume that receives and retains a chilled potable liquid within the interior volume at about ice bath temperature; a liquid carbonator spaced within the interior volume of the insulated potable liquid storage tank and submerged therein and wherein the liquid carbonator is in fluid communication with a pressurized carbon dioxide source tank via a carbon dioxide supply conduit; a high pressure potable liquid pump configured to pump potable liquid from the interior volume of the insulated potable liquid storage tank through a potable liquid conduit to a spray nozzle within an interior volume of the liquid carbonator such that carbon dioxide is supplied at a carbon dioxide pressure from the carbon dioxide tank and carbonation occurs as potable water is delivered to the interior of the liquid carbonator by utilizing the high pressure potable liquid pump and wherein the high pressure potable liquid pump delivers the potable liquid from the interior of the insulated potable liquid storage tank at a variable, but increasing pressure via the spray nozzle at a pressure greater than the carbon dioxide pressure throughout the process of carbonating the water in the liquid carbonator; a cooling subsystem comprising a compressor, a condenser, a condenser fan associated with the condenser, a plurality of coolant conduits, and an evaporator coil wherein the components of the cooling subsystem are in coolant fluid communication with the other components of the cooling subsystem; and wherein the evaporator is positioned in an offsettingly wound and spaced apart relationship with the liquid carbonator such that the evaporator does not physically touch an exterior surface of the liquid carbonator submersed within the chilled potable liquid and the space between the cooling coil and the liquid carbonator is at least substantially free of any other structure other than periodic frozen potable liquid adjacent the evaporator; and a beverage pod system that receives a single serving beverage pod having an identification system on the pod such that a reading system of the beverage pod system reads the identification system and the single serving beverage machine system selectively delivers the hot potable fluid, the ice bath temperature potable fluid, or the carbonated ice bath temperature potable fluid to the single serving beverage pod to produce a finished beverage for a user of the beverage system.

Another aspect of the present disclosure is generally directed to a process of producing a single serving of a beverage comprising the steps of: delivering water from a municipal water source or well water source to an interior volume of an insulated water tank of a single serving beverage dispensing machine; maintaining the temperature of the water inside the tank at a temperature of an ice water bath using a cooling subsystem comprising a compressor, a condenser, an expansion device, and at least one evaporator coil offsettingly wound around and spaced apart from a liquid carbonator wherein the insulated water tank, the carbonator and the cooling subsystem are within a housing of the single serving beverage dispensing machine; providing carbon dioxide at a carbon dioxide pressure to an interior volume of the liquid carbonator from a carbon dioxide source; providing water from inside the tank at a temperature of an ice water bath using a high pressure pump such that the water from the inside of the tank is supplied at a variable pressure that is higher than the carbon dioxide pressure and the water provided from inside the tank is delivered to the interior volume of the liquid carbonator via a spray nozzle to produce a carbonated water within the liquid carbonator; inserting a single serving beverage preparation pod into a pod receiving subsystem within the beverage machine; selectively delivering a treated water that has been treated by the beverage machine to single serving beverage preparation pod positioned within the pod receiving subsystem spaced within the beverage machine wherein the treated water is chosen from the group consisting of a heated water; an uncarbonated water from the interior volume of the tank; and the carbonated water; intermixing the treated water with a beverage preparation material spaced within the single serving beverage preparation pod positioned within the pod receiving subsystem; and dispensing the single serving of beverage produced from the treated water and the beverage preparation material.

BRIEF DESCRIPTION OF THE DRAWINGS

In the drawings:

FIG. 6 is a cross-sectional view taken along line VI-VI in FIG. 4.

FIG. 7 is an enlarged view of section B-B in FIG. 6.

FIG. 13 is a cross-sectional view taken along lines XIII-XIII in FIG. 11.

FIG. 14 is an enlarged view of the piercing mechanism of FIG. 13.

FIG. 18 is a top view of the capsule shown in FIG. 15 with the top composite film partially removed.

FIG. 19 is a top view of the capsule shown in FIG. 15 with the top composite film completely removed.

DETAILED DESCRIPTION OF EMBODIMENTS

Before the present disclosure is described further, it is to be understood that the present disclosure is not limited to the particular embodiments of the disclosure described below, as variations of the particular embodiments may be made and still fall within the scope of the appended claims. It is also to be understood that the terminology employed is for the purpose of describing particular embodiments/aspects, and is not intended to be limiting. Instead, the scope of the present disclosure will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

In this specification and the appended claims, the singular forms "a," "an" and "the" include plural reference unless the context clearly dictates otherwise.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Collapsible Pod

Figure 1A:
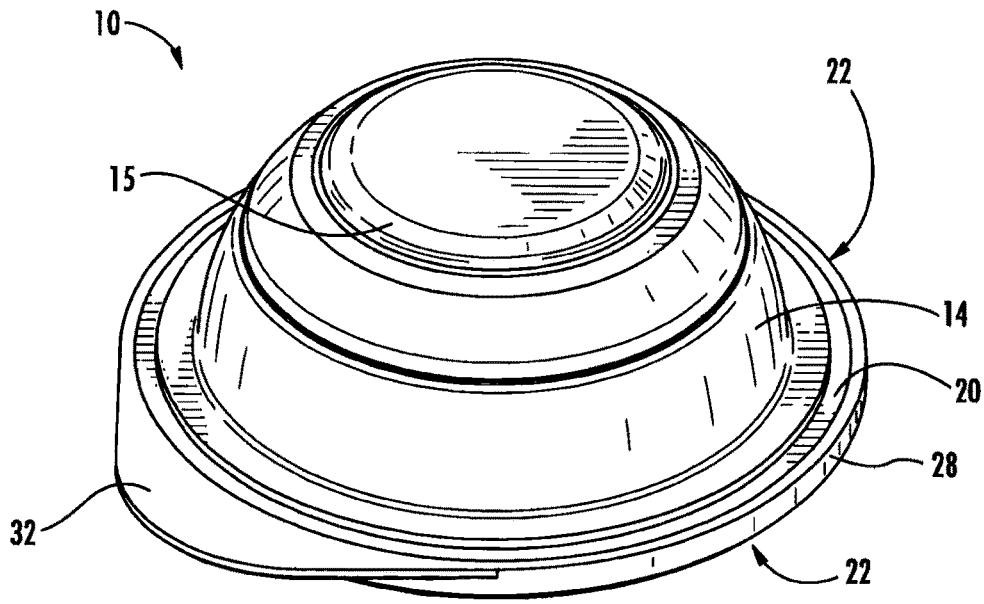
FIG. 1A is a top perspective view of the capsule according to an aspect of the present disclosure.
Figure 1B:
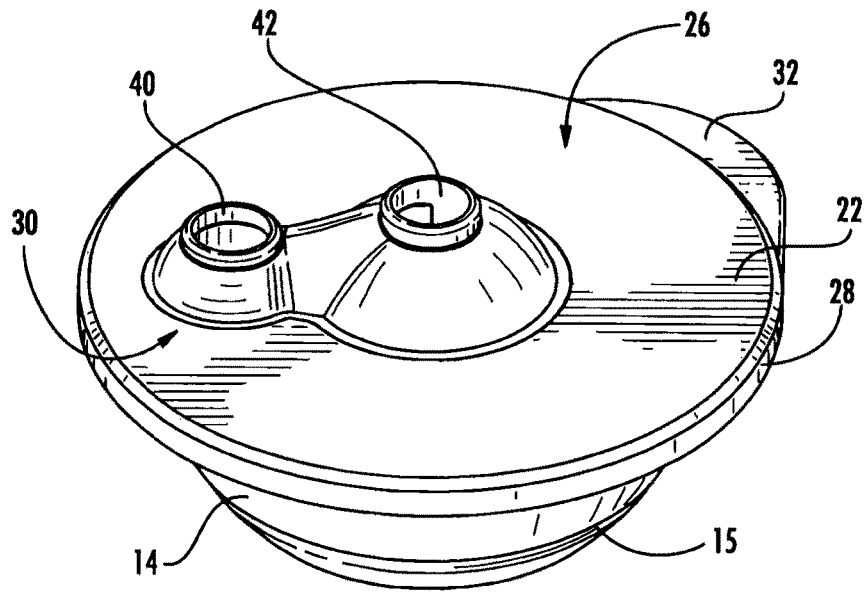
FIG. 1B is a bottom perspective view of the capsule shown in FIG. 1A.

Referring to FIGS. 1A and 1B, reference numeral 10 designates collapsible pod or capsule with capsule body or pod body 14 and capsule cap or pod cap 22. The capsule body 14 may have a generally frustoconical shape, as shown in FIGS. 1A and 1B, and may be made of plastic or polymer material, but this disclosure could apply to any number of materials and shapes. Ridge-like features 15 on capsule body 14 act as a collapsible mechanism, enabling the body to fold into a flattened shape when compressed. The ridge-like features 15 provide an area around the perimeter of capsule body 14 where the material making up capsule body 14 may fold onto itself, allowing the capsule body to flatten when compressed and expel all the concentrate or powder material therein. Capsule cap 22 may have wing(s) 32 at the sides of capsule cap 22. FIGS. 1A and 1B show only one wing, however multiple wings may also be used. Wing(s) 32 allow users to easily facilitate insertion and removal of the pods from a mechanism used in connection with the pod. In addition, the wings may provide a profile that may mate with a cutout in the mechanism, guaranteeing that the pod is correctly and securely loaded to prevent leakage and the mechanism will function properly. The mechanism is typically positioned within an appliance such as a refrigerator or is in an independent, oftentimes, countertop beverage dispensing appliance.

FIG. 1B shows distributor cap 30 at the bottom side of capsule cap 22. Distributor cap 30 may be made of plastic or polymer material and sonically welded to the bottom of the capsule cap, but it should be known to those within the art that this disclosure could apply to any number of materials and attachment methods. Distributor cap 30 may have water inlet 40 and beverage outlet 42. Mixing space 44 (see FIG. 2) is located inside of distributor cap 30, between water inlet 40 and beverage outlet 42.

Figure 2:
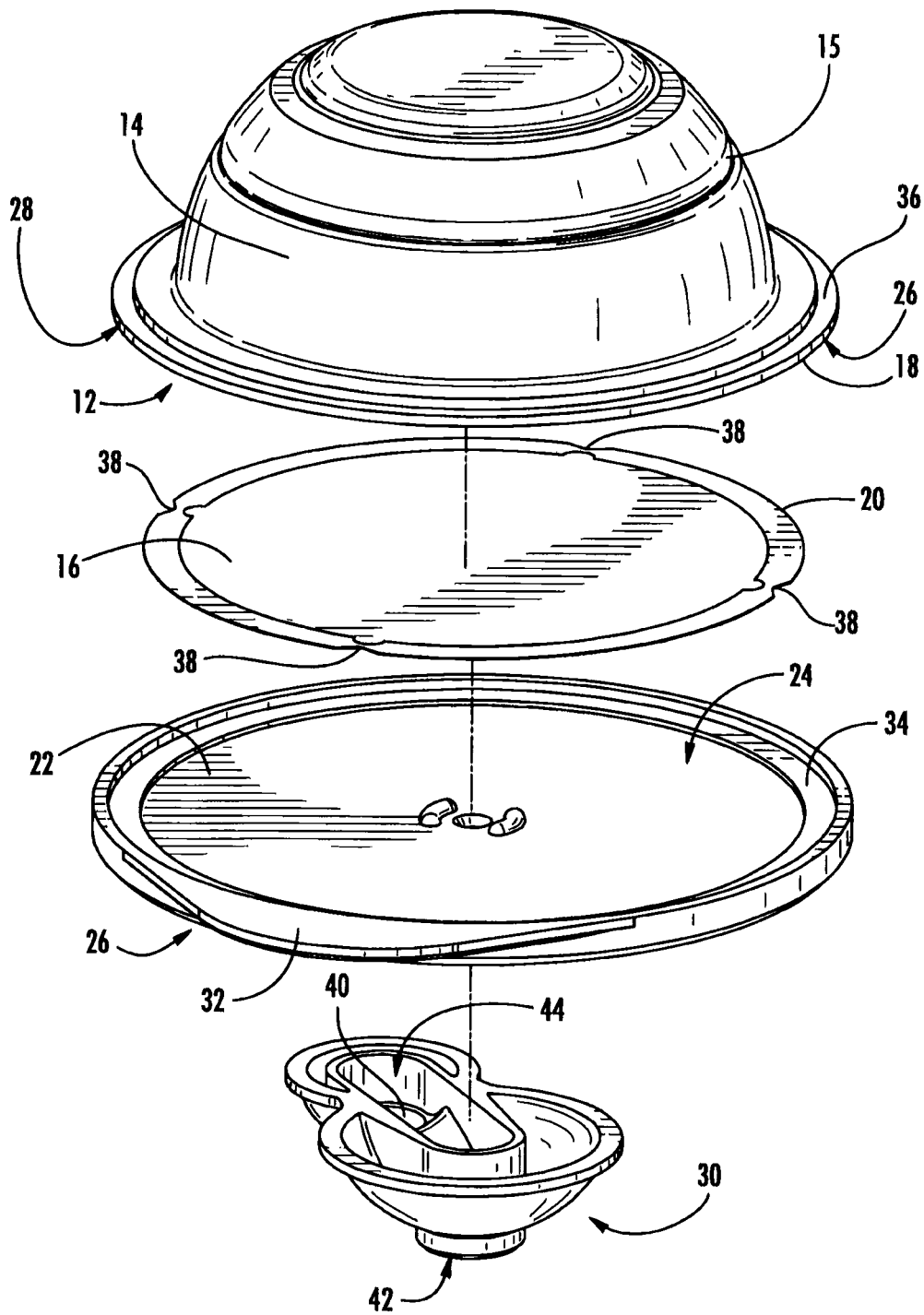
FIG. 2 is an exploded view of the capsule shown in FIGS. 1A and 1B.
Figure 3:
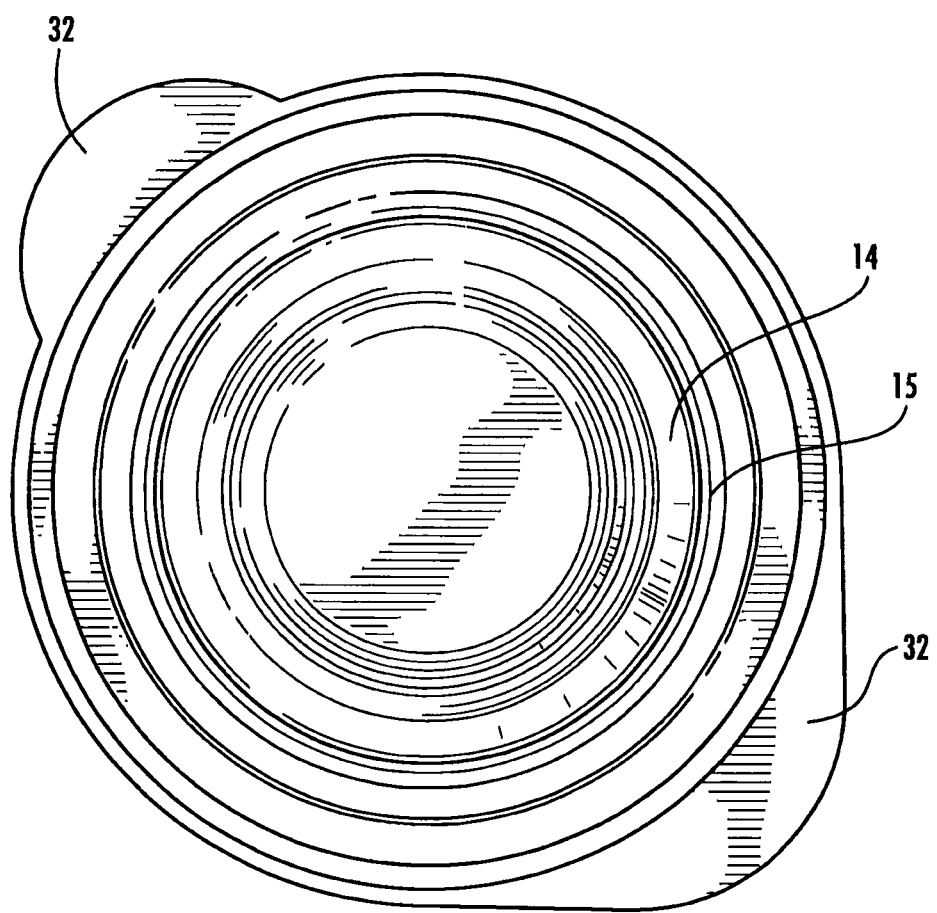
FIG. 3 is a top view of the capsule shown in FIG. 1A.
Figure 4:
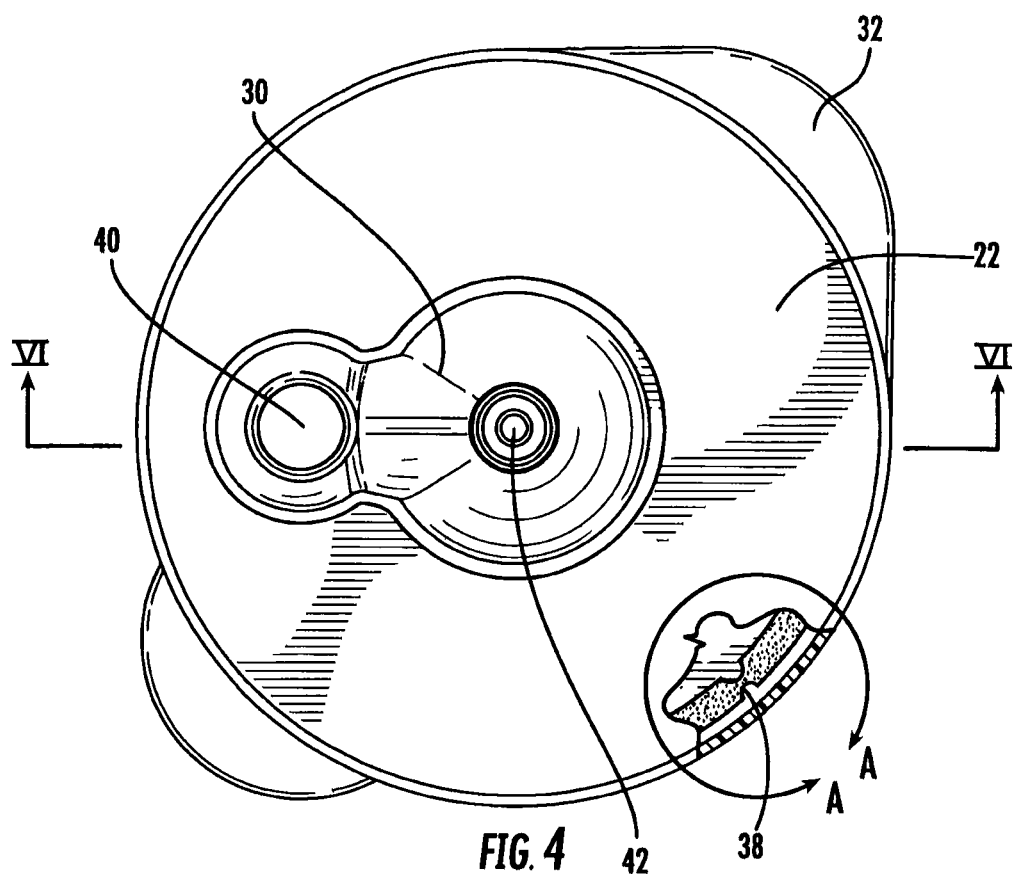
FIG. 4 is a bottom view of the capsule shown in FIG. 1A, but having two finger receiving wings instead of one.
Figure 5:
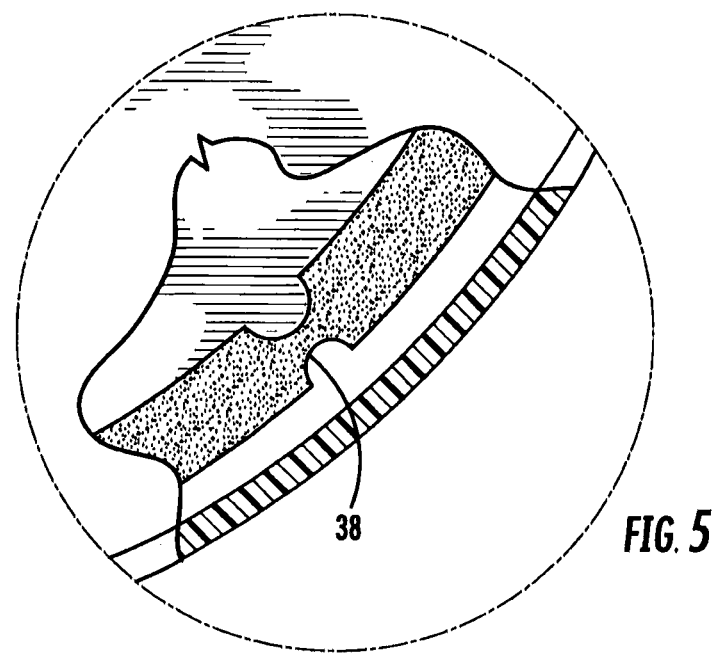
FIG. 5 is an enlarged section view of the capsule shown in FIG. 4 along line A-A with an enlarged section view of the channel and sharp edges.

As shown in FIG. 2, collapsible pod 10 may include composite film 16 located between capsule body 14 and capsule cap top side 24. Composite film 16 may be heat staked to capsule body 14 at capsule body male lip 36, but any number of attachment methods may be used such as an adhesive attachment. Capsule cap female lip 34 fits over capsule body male lip 36 and capsule cap 22 may then be sonically welded to capsule body 14, but again any number of attachment methods such as adhesive attachments may be used. The attachment should create a liquid tight seal. Weak point(s) 38 may be located at composite film perimeter 28.

Interior space 12 exists between composite film 16 and capsule body 14 and may be filled with a beverage concentrate.

Collapsible Pod Mechanism

Figure 21:
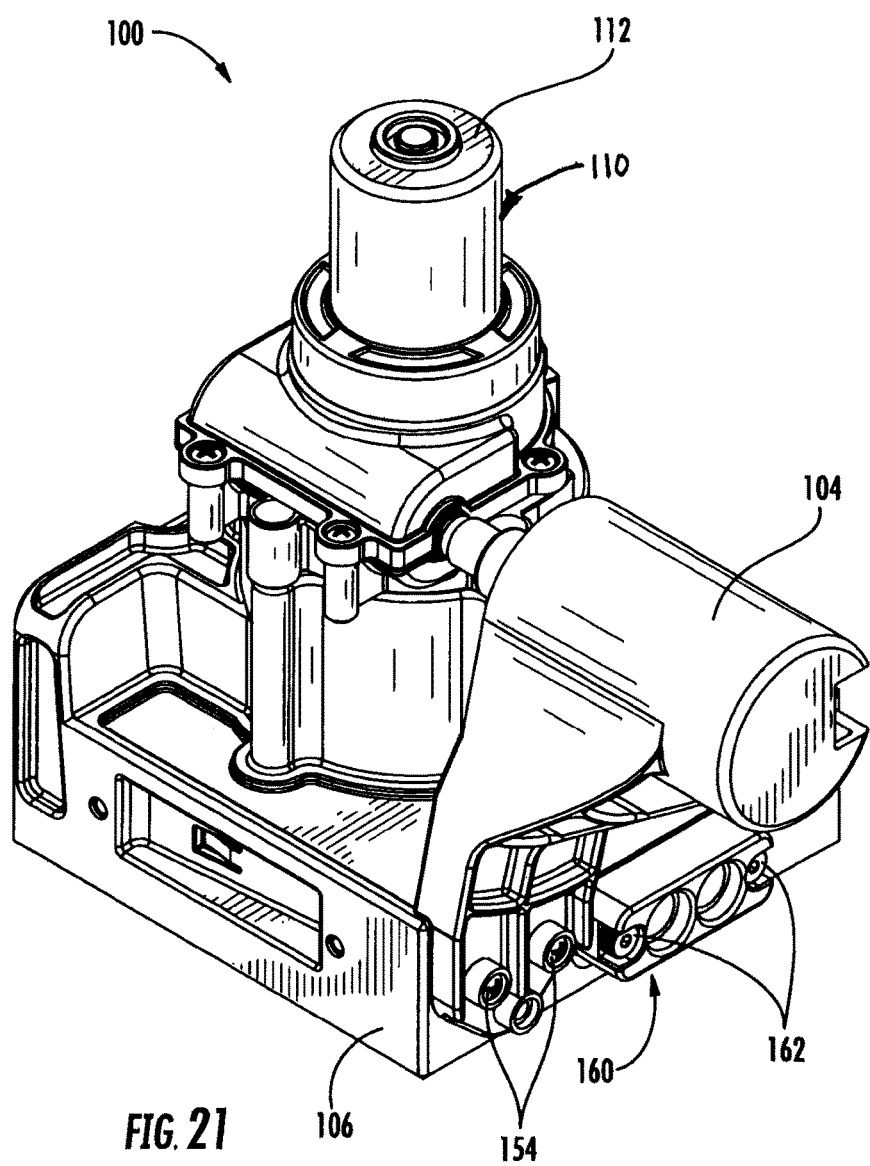
FIG. 21 is a perspective view of the front side of a collapsible pod mechanism according to an embodiment.
Figure 22:
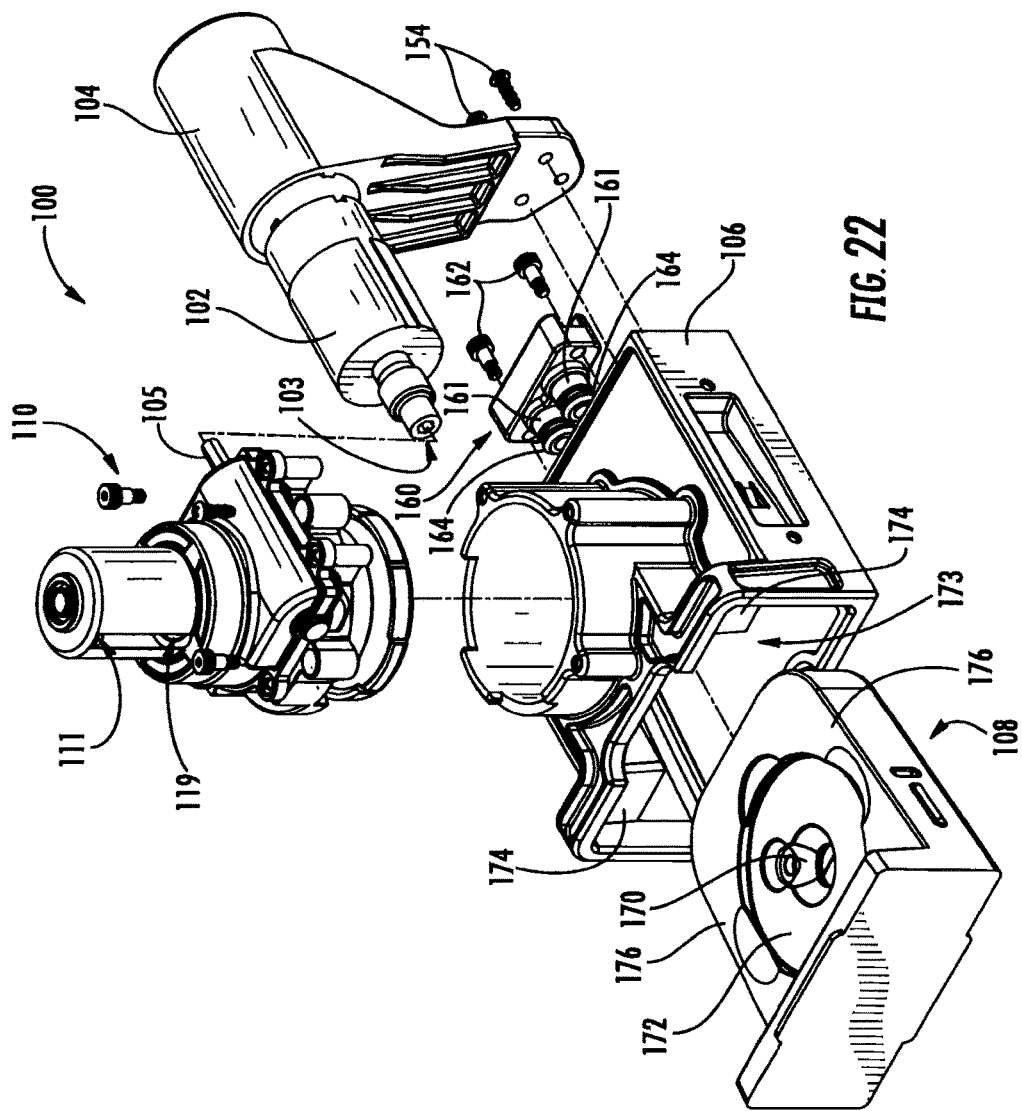
FIG. 22 is an exploded view of the collapsible pod mechanism shown in FIG. 21.
Figure 23:
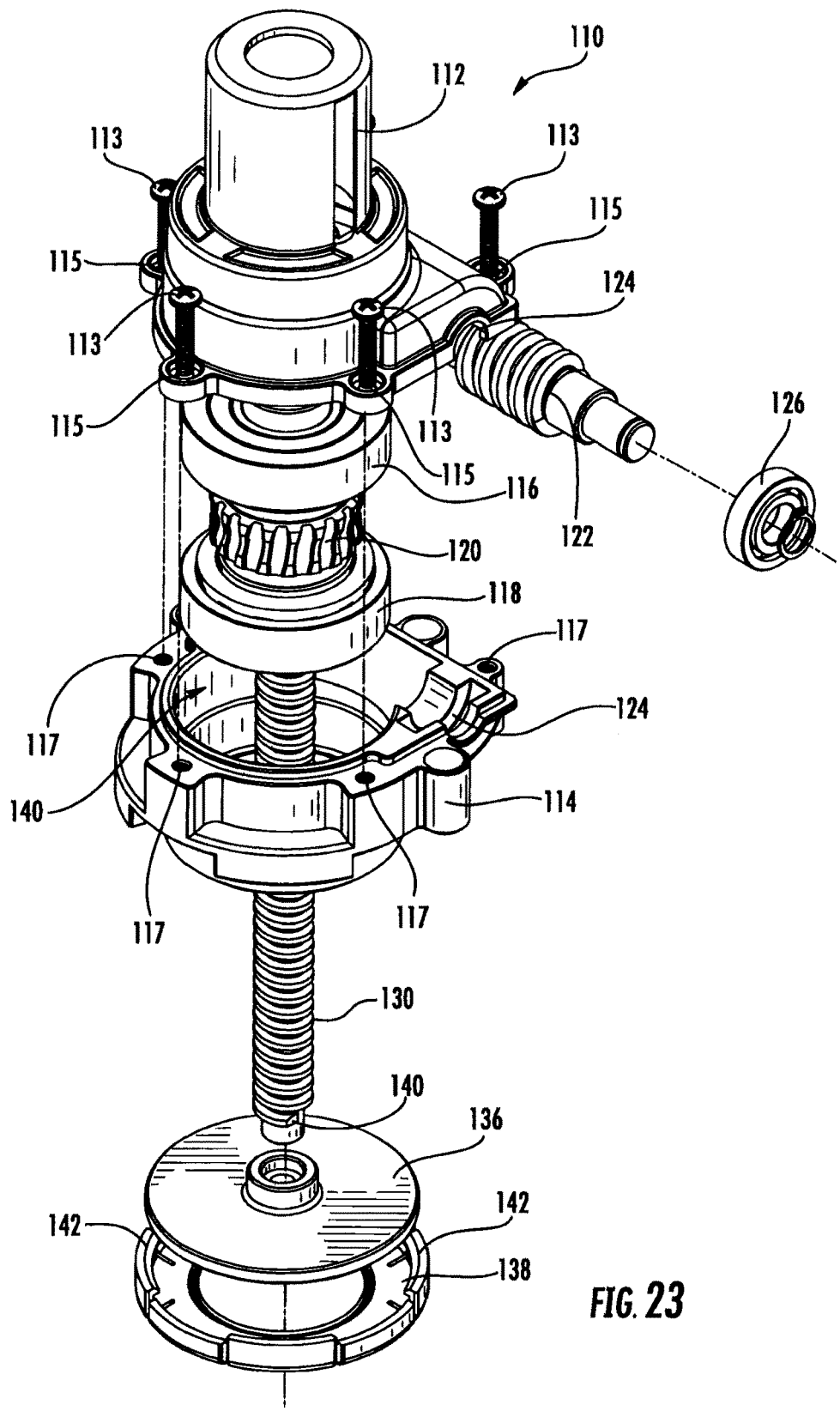
FIG. 23 is an exploded view of the gear box assembly of the collapsible pod mechanism shown in FIG. 21.
Figure 24:
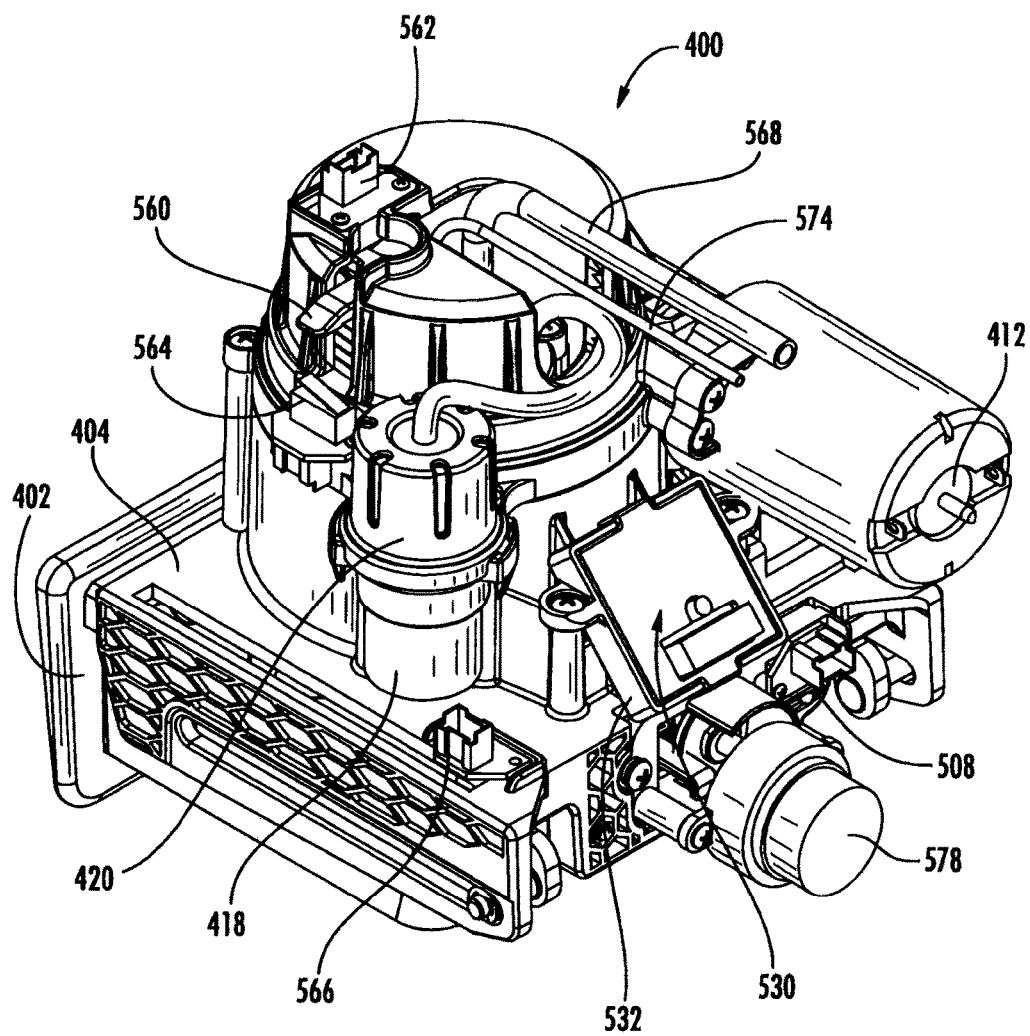
FIG. 24 is a perspective view of the front side of a piston pod mechanism according to an embodiment.

As shown in FIGS. 21-23, a collapsible pod 10 may be loaded into collapsible pod mechanism 100. The collapsible pod mechanism typically includes motor 102, motor housing 104, main frame 106, drawer assembly 108, and gear box assembly 110. Gear box assembly 110 may have top housing 112 and bottom housing 114, with much of the parts that make up gear box assembly 110 fitting between those pieces. Top housing 112 and bottom housing 114 (see FIG. 23) may be constructed of metal, plastic, or polymer material, but it should be known to those within the art that any number of different materials may be used. Top housing 112 and bottom housing 114 may be matingly attached to one another by screws 113 or clips or other suitable attachment methods. Screws 113 may fit through eyelets 115 in top housing 112 and thread into threaded holes 117 in bottom housing 114. First microswitch 111 may be located toward a top side of gear box assembly top housing 112 and second microswitch 119 may be located toward a bottom end of gear box assembly top housing 112.

A top bearing 116 may sit above, and bottom bearing 118 may sit below worm gear 120. Top bearing 116 and bottom bearing 118 may be used to reduce friction and provide smoother rotation of worm 122. Worm gear 120 may be rotatably engaged with worm 122, which may be attached between top housing 112 and bottom housing 114. Worm 122 may connect to top housing 112 and bottom housing 114 via bearing 126 in cutout 124 that is semicircle shaped to fit bearing 126 material; however, the cutout can be any shape so long as there is no interference with the rotation of worm 122. Shaft 130 may be attached to worm gear 120 at a first end and connected to interface bracket 136 and interface 138 at second end 134 via connection 140. Connection 140 may be a threaded or screw connection, but it should be known to those within the art that this disclosure could apply to any number of connections. There, interface bracket 136 is typically circular shaped components as shown in FIG. 23. Interface 138 may have snap connections 142, which may fit over interface bracket 136 and may attach interface 138 to interface bracket 136 and shaft 130. Worm 122, worm gear 120, and shaft 130 may all be made of metal, plastic, alloy, or polymer material and top 116 and bottom 118 bearings may be constructed of a mixture of plastic, polymer, and metal for their component parts. Bearing 126 may provide advantages such as decreased friction between the worm 120 and gear box assembly 110.

Motor 102 may be integrally attached to motor housing 104. Motor 102 may be an electric motor or any other motor that is known in the art. Motor 102 may be connected to main frame 106 and may be connected using housing screw(s) 154. Motors are well known in the art and any such motor could be used in conjunction with the present disclosure. Motor 102 may be rotatably mated to worm 122. Motor 102 may have a multiple part cylindrical shape. The cylindrical shape provides space saving benefits over other designs and facilitates balanced rotation. Motor 102 may have a female hex motor drive connection 103 which may matingly engage with a male hex worm drive connection 105. Allen drive may provide manufacturing and connectivity benefits over other drive connections known in the art.

Water inlet adapter 160 may be connected to main frame 106 and may be connected using adapter screw(s) 162. Water inlet adapter 160 may provide a mechanism through which water and other liquids, even air, may flow into collapsible pod mechanism 100. Water inlet adapter 160 may have protruding end 161 which may matingly engage with main frame protruding end fitting 163. Inlet adapter gaskets 164 may attach to protruding end 161 providing a seal between water inlet adapter 160 and main frame 106.

As shown in FIG. 22, drawer assembly 108 may have pod cutout 170, which may be configured to accept collapsible pod 10. Pod cutout 170 may be of substantially the same shape as collapsible pod 10 or may use any other method known in the art to accept and engage collapsible pod 10. Interface cutout 172 may be configured to accept interface 138 and may be of substantially the same shape as interface 138. Drawer assembly 108 may be configured to slidably engage with main frame 106. Drawer assembly may be completely removable from main frame or may slide out at least a majority of its depth, but enough to load a pod into the pod cutout 170. Main frame 106 may have side stays 174 which may engage with drawer assembly stays 176, preventing substantial movement of the drawer assembly 108 within main frame 106. Switch 178 may be located in the drawer assembly slot 173 within the main frame 106 and may be in communication with a controller 180 (not shown), which can be a printed circuit board, microprocessor or central processing unit (CPU).

A user may load a pod into drawer pod cutout 170 then push drawer assembly 108 into main frame 106. A third microswitch (not shown) may detect the presence or absence of drawer assembly 108 within main frame 106 and may send a signal to controller 180 to turn on an optical reader when drawer assembly 108 is closed into main frame 106. Gasket (not shown) may create a seal between water inlet 40 of collapsible pod 10 and a waterway into drawer assembly 108. There may be two separate waterways into the drawer assembly: the first may connect with water inlet 40; and the second may bypass pod 10 and dispense directly.

The optical reader may scan drawer assembly to identify the beverage selection, such as the type of pod present in drawer assembly 108. Controller 180 may then energize motor 102 which may turn worm 122. Worm 122 may have threads which may be rotatably connected to worm gear 120 which drives shaft 130 downwards until it closes second microswitch 119. The second microswitch being closed signifies signify that the gear box assembly is in an away position, a fact communicated to the controller.

Interface 138 may be attached to an end of shaft 130 and may come into contact with capsule body 14. Shaft 130 may be driven by gear box assembly 110 and may move at various speeds depending on the beverage selection identified by optical reader. When interface 138 comes into contact with capsule body 14, ridge-like features 15 cause capsule body 14 to collapse into a flat shape. While interface 138 driven by shaft 130 crushes capsule body 14, water may flow through collapsible pod distributor cap 30 and mix with concentrate in mixing space 44. The beverage then flows out of beverage outlet 42. When dispensing is complete, motor 102 may spin in reverse, retracting shaft 130 until it opens the second microswitch, and closes the first microswitch, signifying gear box assembly 110 is in the "home" position.

Piston Pod

Figure 8:
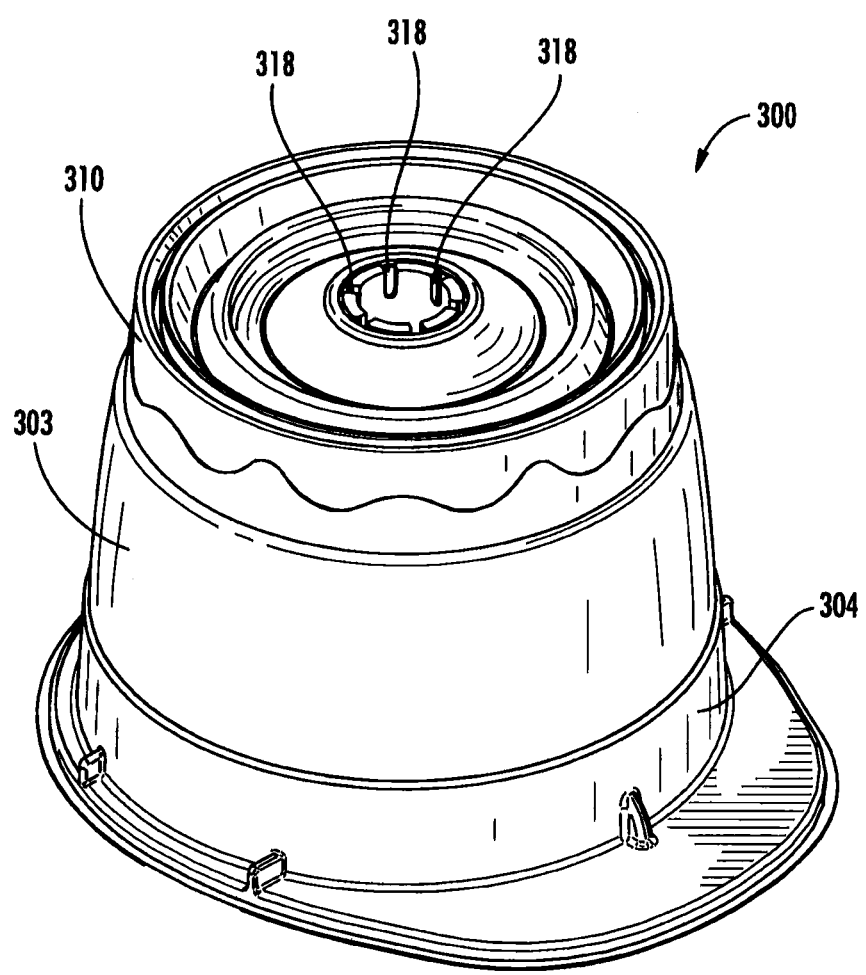
FIG. 8 is a perspective view of a capsule according to another embodiment of the present disclosure.
Figure 9:
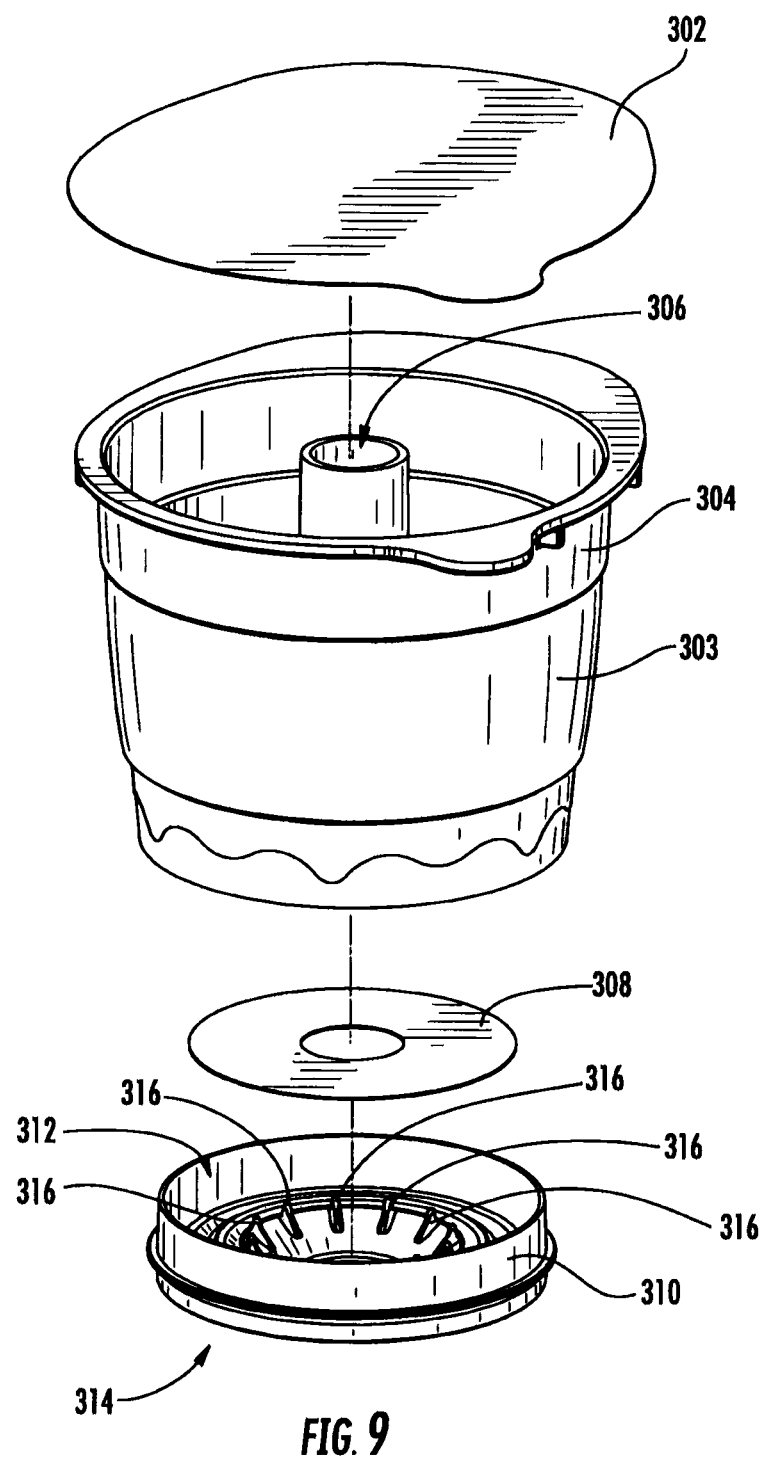
FIG. 9 is an exploded of the capsule shown in FIG. 8.
Figure 10:
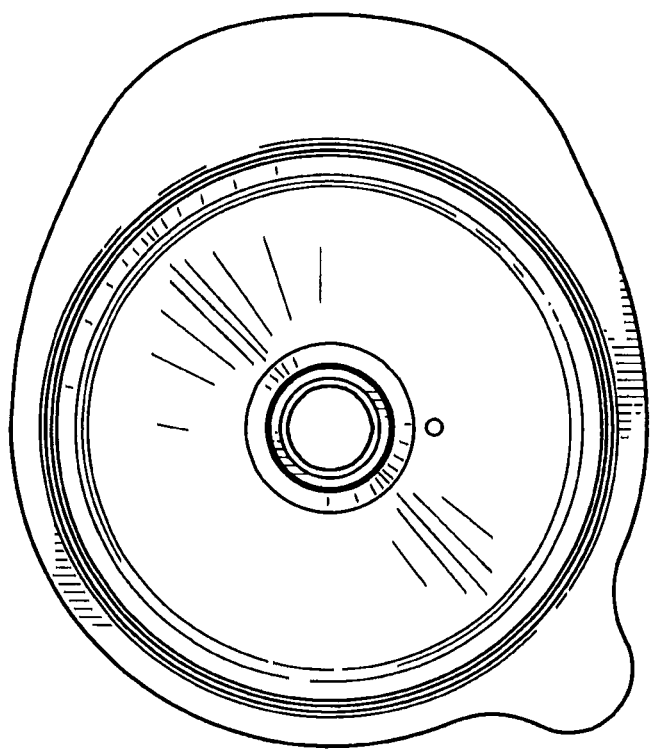
FIG. 10 is a top view of the capsule shown in FIG. 8 with the composite film removed.
Figure 12:
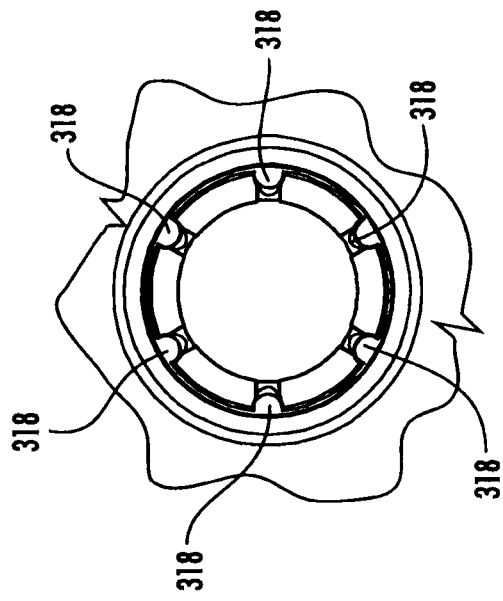
FIG. 12 is an enlarged view of the center section of FIG. 11.
Figure 11:
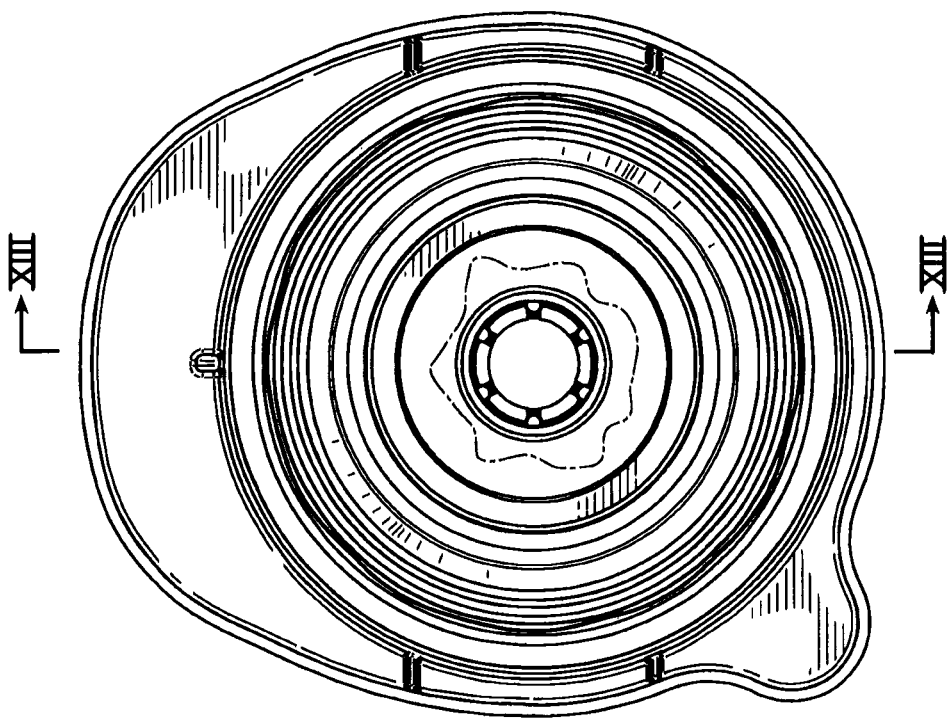
FIG. 11 is a bottom view of the capsule shown FIG. 8.
Figure 15:
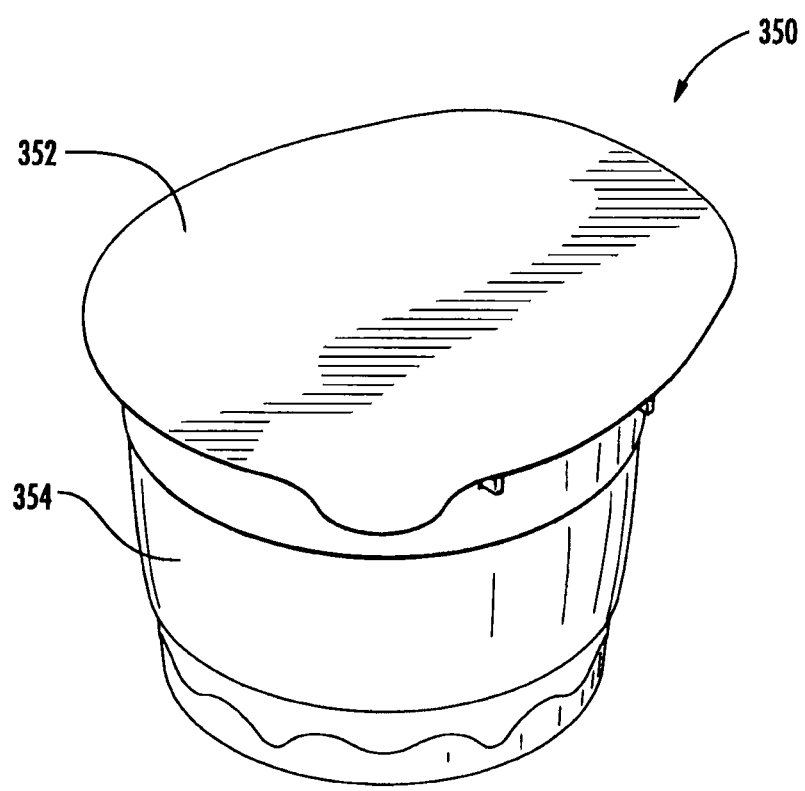
FIG. 15 is a perspective view of a capsule according to yet another embodiment.
Figure 16:
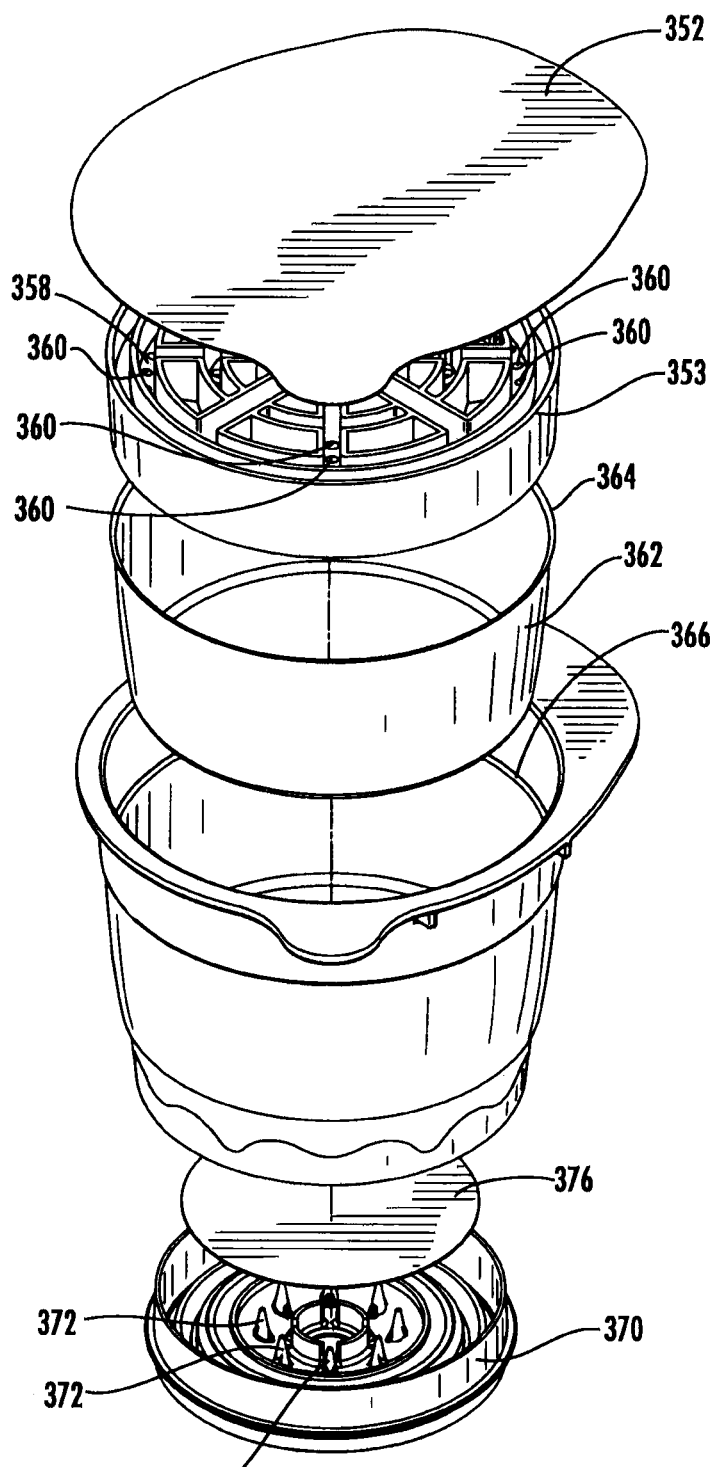
FIG. 16 is an exploded view of the capsule shown in FIG. 15.

Referring to FIG. 8, 300 designates a piston pod generally. Top composite film 302 is attached to a top side 304 of capsule body 303. Center column 306 (see FIG. 9) may be attached to capsule body 303 or may be part of capsule body 303. Center column 306 may be a hollow tube that runs from just beneath top composite film, through capsule body 303 and through bottom composite film 308 to capsule cap 310. Center column 306 provides a direct path for liquid to flow through capsule body 303 without mixing with fluids. A direct flow method allows for better overflow rates and mixing rates as compared to other methods.

Bottom composite film 308 may be attached to a bottom surface of capsule body 303. Top composite film 302 and bottom composite film 308 may be heat staked to capsule body 303, or may be attached with any other method known in the art. Heat staking provides some benefits over other methods of attaching materials because is it cost effective and provides reliable liquid-tight sealing as compared to other methods. Capsule cap 310 may be sonically welded or snap fitted to capsule body 304, but it should be known to those within the art that this disclosure could apply to any number of attachment methods or the conceivably could be made as one integral piece. Capsule body 303 may have a generally frustoconical shape (see FIG. 8), and may be made of plastic or polymer material, but it should be known to those within the art that this disclosure could apply to any number of materials and shapes.

Figure 17A:
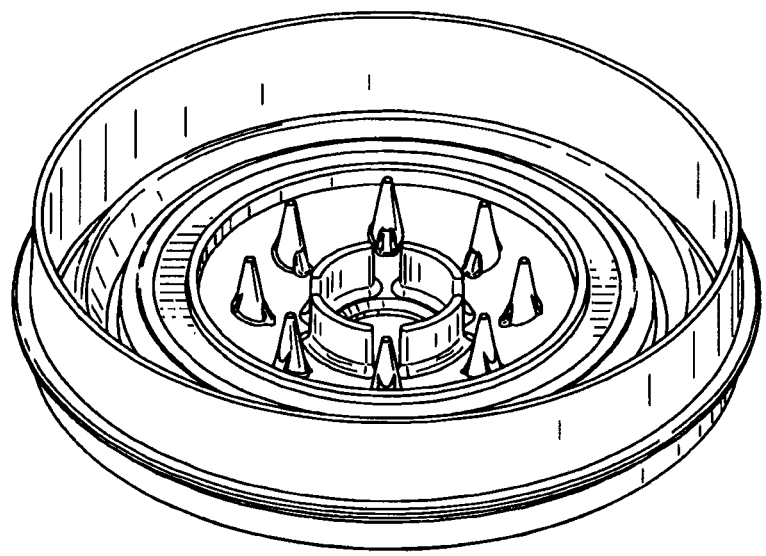
FIG. 17A is an enlarged perspective view of the inside of the capsule cap of the capsule shown in FIG. 15.
Figure 17B:
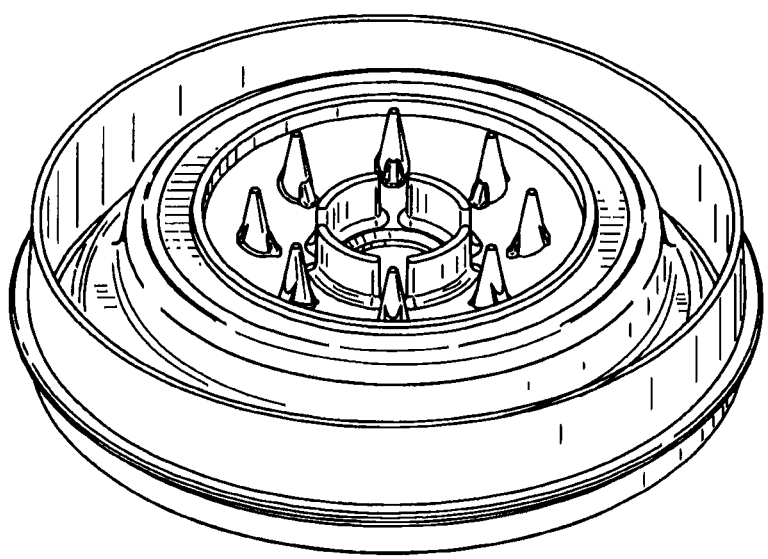
FIG. 17B is an enlarged perspective view of the inside of the capsule cap of the capsule shown in FIG. 15 with the center diaphragm extended upward.
Figure 20:
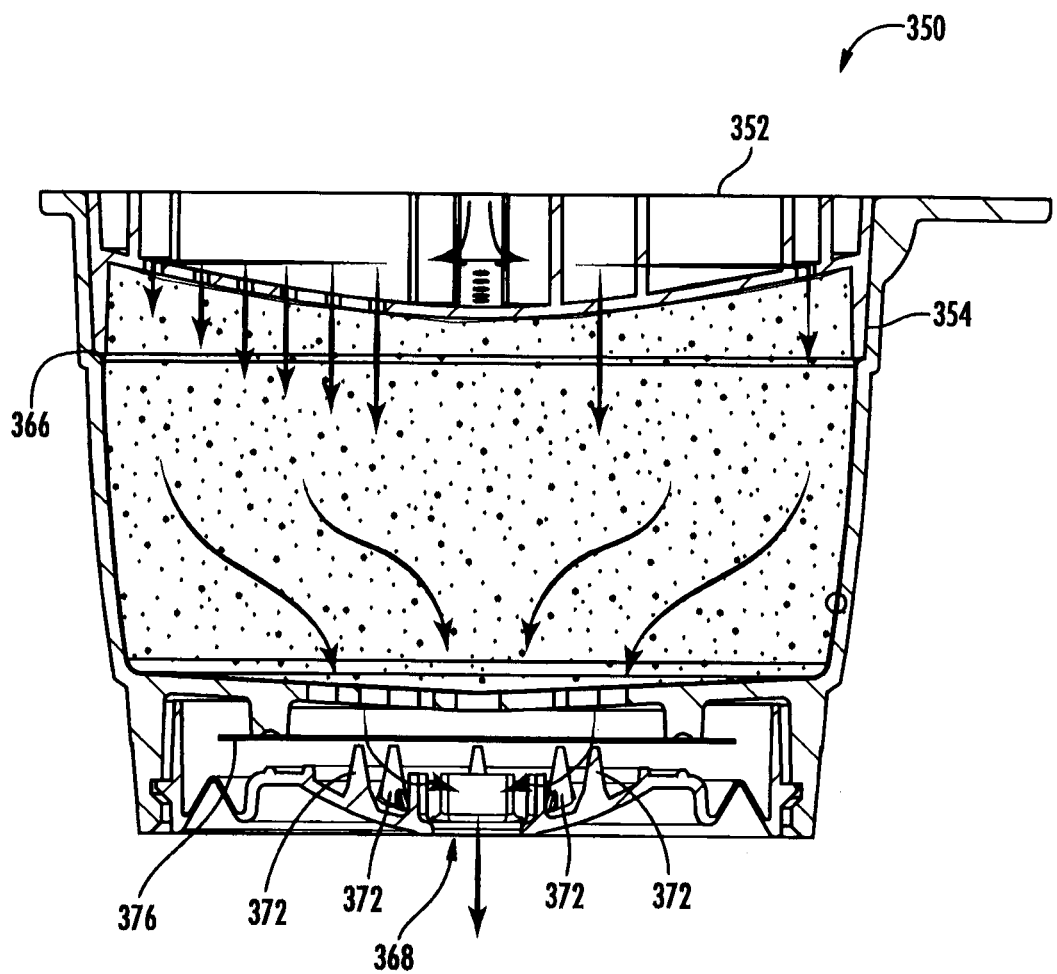
FIG. 20 is a section view of the capsule shown in FIG. 15.

Capsule cap 310 may have an inner side 312 and an outer side 314. Inner side 312 may have spike(s) 316, which can be projections or inwardly extending members integrally formed with the diaphragms and outer side may have nozzle(s) 318. Capsule cap 310 may flex inwardly, like a diaphragm (see FIGS. 17A and 17B), when a force is applied at outside side 314. When capsule cap 310 flexes upward, spike(s) 316 creates incisions in bottom composite film 308. Capsule body 304 may be filled with a concentrate, typically a liquid concentrate, and when the spike(s) create incisions in bottom composite film, the liquid concentrate may be released from within capsule body 304.

In another embodiment, piston pod 350 may lack center column 306 of the embodiment shown in FIGS. 15-20. Top composite film 352 may be attached to top cap 353 and/or capsule body 354. Top cap 353 may be attached to capsule body 354. Top composite film 352 and top cap 353 may be attached by heat staking the pieces together or an adhesive may be used to attach the composite film, but it should be known to those within the art that this disclosure could apply to any number of attachment methods.

Top cap 353 may have recessed pocket 356, which may function to isolate an air nozzle from water backflow. Top cap 353 may act to evenly distribute liquid across capsule body 354. In one embodiment, even distribution may be achieved by laying out a series of channel(s) 358 within top cap 353. Channel(s) 358 may create flow paths which direct liquid to hole(s) 360. Hole(s) 360 may penetrate through top cap 353, allowing liquid to pass through hole(s) 360 into capsule body 354. Such a method of distributing liquid helps ensure an even distribution of the liquid, which provides a higher quality beverage and lowers cost by decreasing the amount of concentrate, typically a powder concentrate, or grounds necessary to produce the beverage.

Filter 362 may be located within capsule body 354. Filter 362 may be lip attached to capsule body 354, wherein the bottom filter lip 364 mates with capsule body lip 366 and is held in place with top cap 353 resting on capsule body lip 366 to hold filter 362 in place. However, it should be known to those within the art that this disclosure could apply to any number of attachment methods. Filter 362 may prevent small particles from escaping capsule body 354 to ensure only liquid beverage escape through outlet 368.

Piston Pod Mechanism

FIGS. 24-28, show a piston pod mechanism 400 that may be comprised of drawer assembly 402 (see FIG. 28), main frame 404, worm gear 406, drawer open/close module 408, motor housing 410, motor 412, worm 414, manifold assembly 416 (see FIG. 27), air pump 418, air pump housing 420, and top housing 422.

Figure 25:
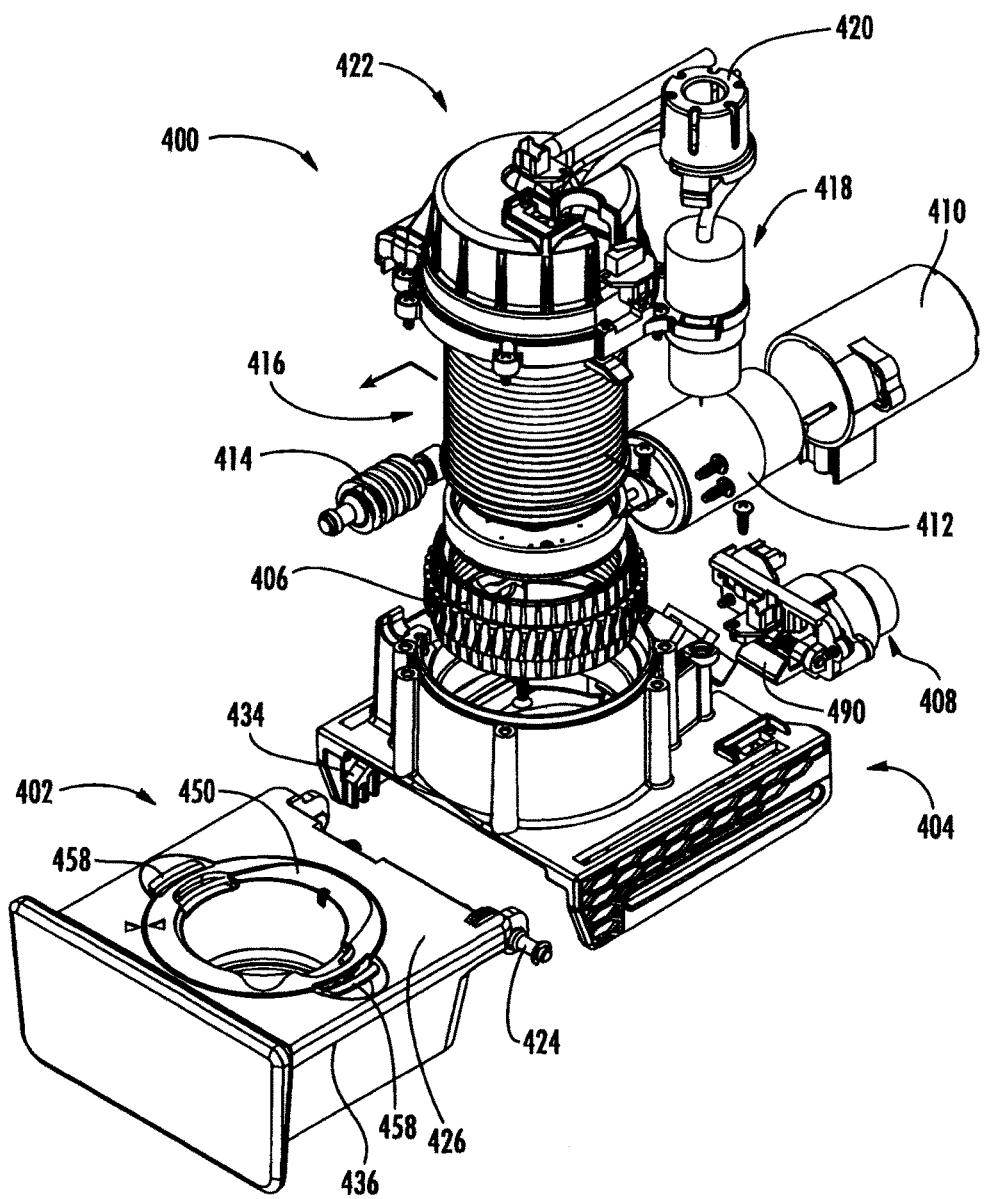
FIG. 25 is an exploded view of the piston pod mechanism shown in FIG. 24.
Figure 26:
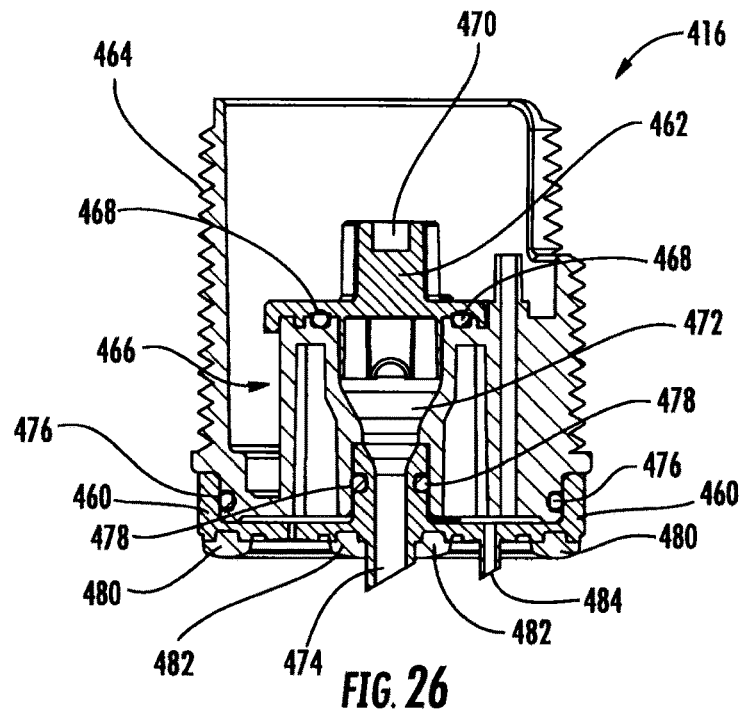
FIG. 26 is a section view of the manifold assembly of the piston pod mechanism shown in FIG. 24.
Figure 27:
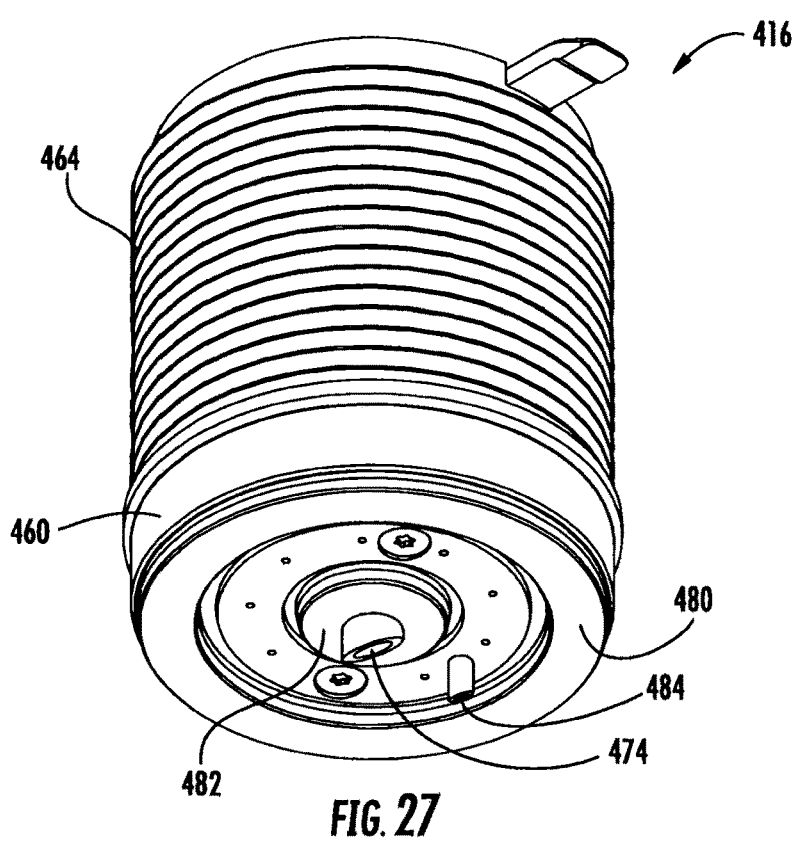
FIG. 27 is an enlarged perspective view of the manifold assembly of the piston pod mechanism shown in FIG. 24.
Figure 28:
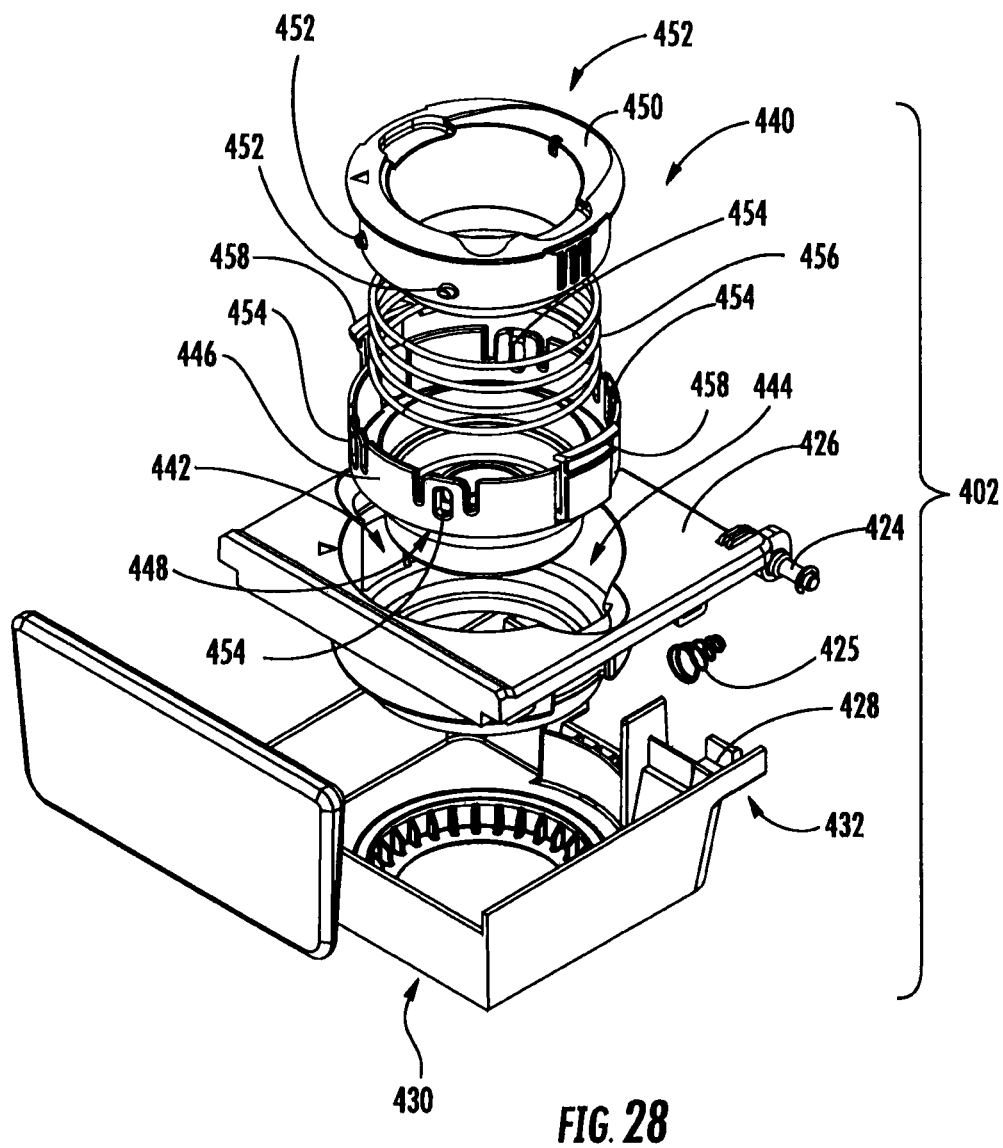
FIG. 28 is an exploded view of the removable insert of the piston pod mechanism shown in FIG. 24.

As shown in FIG. 25, drawer assembly 402 may be slidably engaged with main frame 404 such that drawer assembly 402 may slide into and out of main frame 404. Drawer assembly 402 may connect to cover 430 using dowel pin 424, which may be connected using heat molded plastic, slot and tab, or adhesive to drawer assembly frame 426, but it should be known to those within the art that this disclosure could apply to any number of attachment methods. As shown in FIG. 28, dowel pin 424 may be held into connection 428 of cover 430 with compression spring 425. Compression spring 428 may be compressed to allow dowel pin 424 to be removed from connection 428 and frame 426 may then be removed from cover 430.

Drawer assembly 402 may slide into and out of main frame 404. The assembly 402 may slidably engage with adapter 434 to attach to main frame 404. The lip 436 may engage with adapter 434 which may have a tapered cross section and be received within side decking groovers of the main frame 404. Lip 436 of cover 430 may then slides into and along the interior of main frame within the grooves on each side of the main frame 404.

Removable insert 440 may matingly engage with slot 442 in drawer assembly frame 426. Slot 442 may be configured with drawer assembly frame rim 444. Removable insert base lip 448 may rest on drawer assembly frame rim 444. Cup 450 may have standoffs 452 which may snap into tracks 454 on base 446. Removable insert compression spring 456 may fit between cup 450 and base 446. Spring 456 may rest on a lip in base 446.

Manifold assembly 416 may be located between top housing 422 and manifold interface 460. Manifold cover 462 may be located inside manifold shaft 464 and may seal to the fluid chamber assembly 466 with O-ring 468. Fluid feed line (not shown) may run into fluid feed line adapter 470 shown at top of manifold cover 462. Fluid feed line 568 (FIG. 24) may run through manifold cover 462 into funnel 472. A cutout (not shown) in fluid feed line 568 at the junction of fluid feed line 568 and funnel 472 may create a thrust vector which may bend the fluid flow path toward the center of water nozzle 474, which may connect to an outlet end of funnel 472. Water nozzle 474 may protrude through manifold interface 460. Water nozzle 474 may have a sharp edge at the outlet end which may facilitate tearing through top composite film 302, 352 of piston pod 300, 350. O-ring 476 may seal a connection between manifold shaft 464 and manifold interface 460. O-ring 478 may seal a connection between fluid chamber assembly 466 and manifold interface 460. Outer gasket 480 may seal a connection between manifold interface 460 and an outer perimeter of piston pod 300, 352, and inner gasket 482 may seal a connection between manifold interface 460 and an inner perimeter of piston pod 300, 352. Together, inner gasket 482 and outer gasket 480 may create a leak free connection between manifold interface 460 and pod 300, 352. Air nozzle 484 may protrude through manifold interface 460. Air nozzle 484 may have a sharp edge at outlet end which may facilitate tearing through top composite film 302, 352 of piston pod 300, 350.

Figure 29:
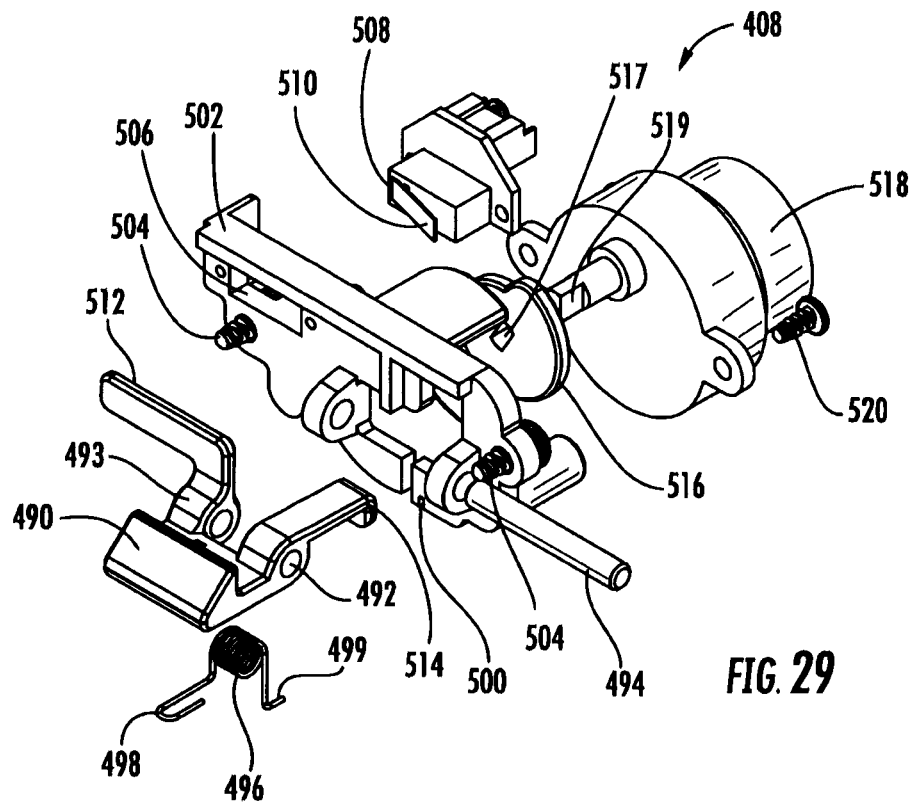
FIG. 29 is an exploded view of the drawer open/close module of the piston pod mechanism shown in FIG. 24.
Figure 30:
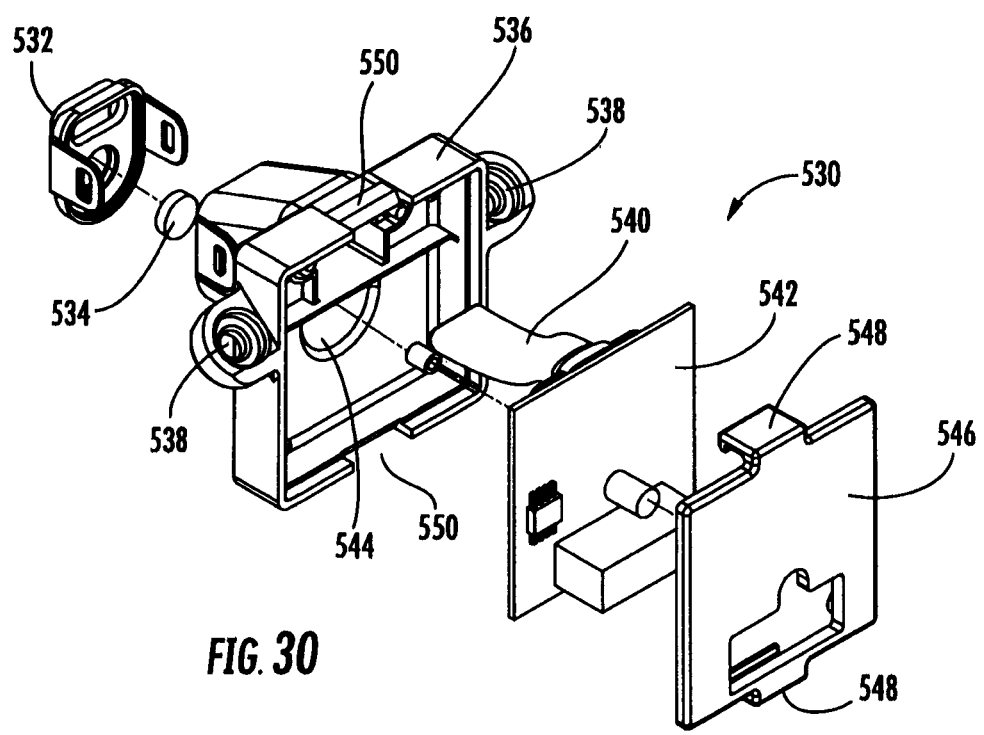
FIG. 30 is an exploded view of the optical reader of the piston pod mechanism shown in FIG. 24.
Figure 31:
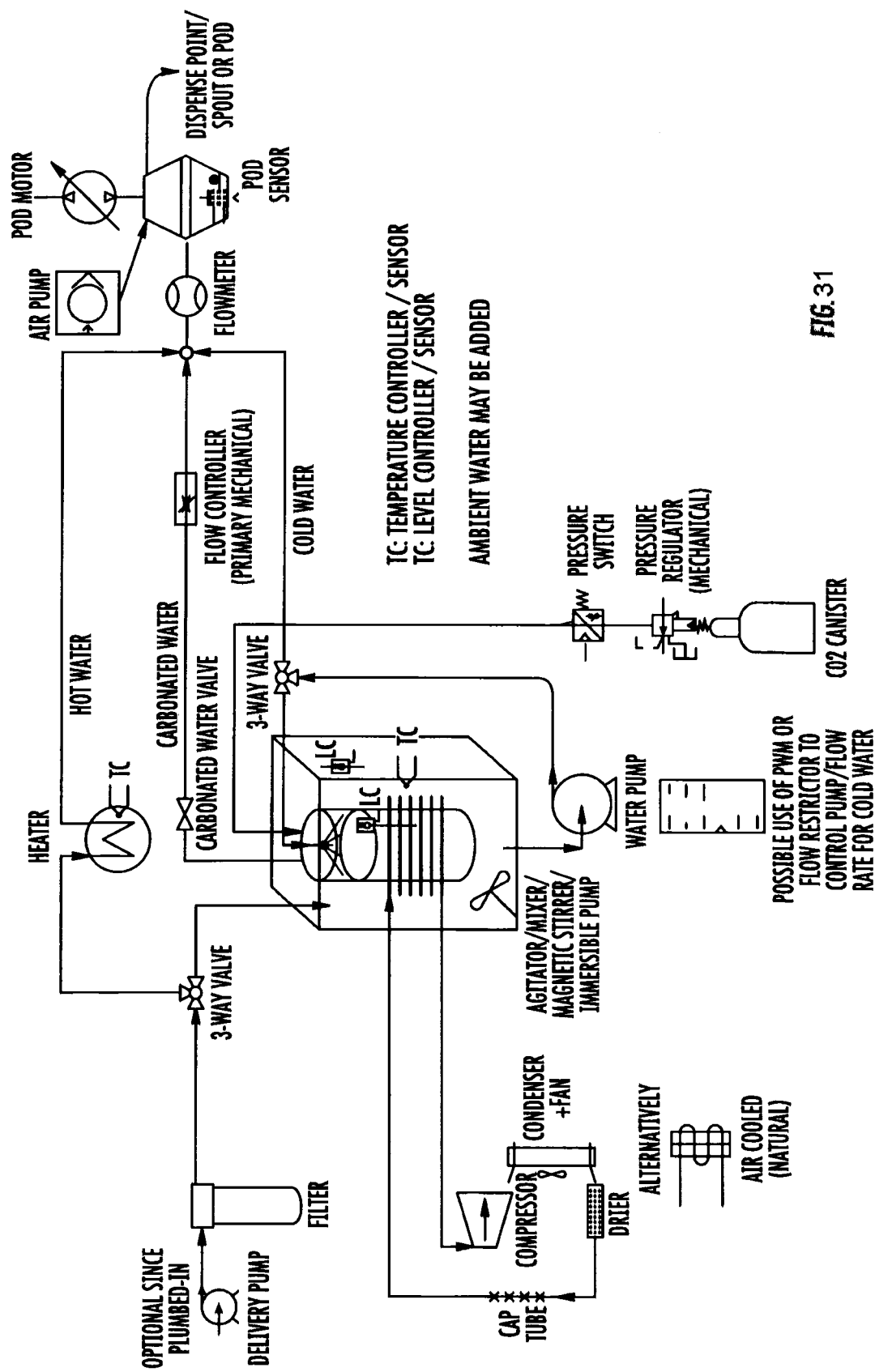
FIG. 31 is a schematic view of the cooling and carbonation system of a beverage system according to an aspect of the present disclosure.
Figure 32:
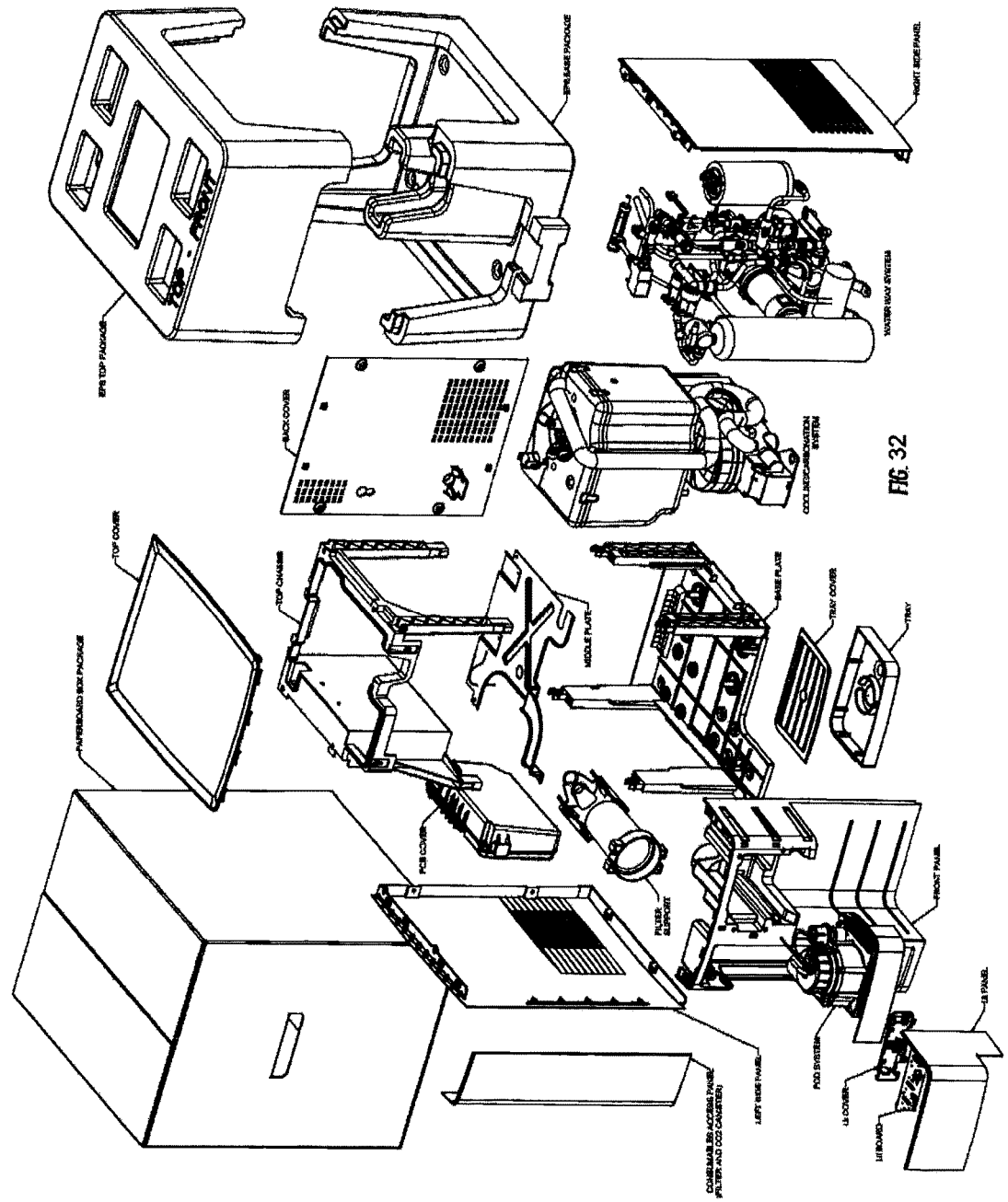
FIG. 32 is an exploded perspective view of the overall beverage system and packaging for the beverage system according to an aspect of the present disclosure.
Figures 33, 34, 35:
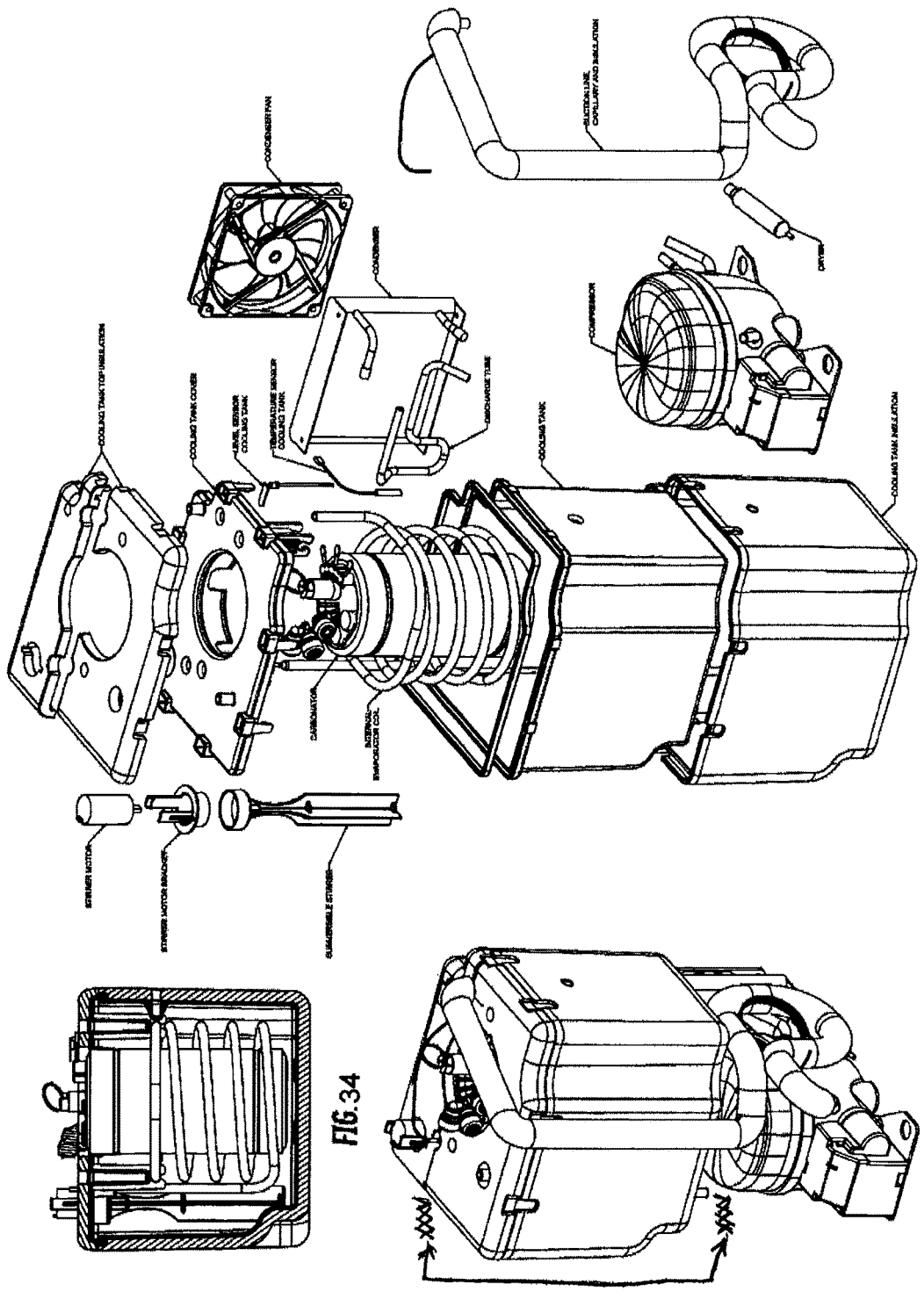
FIG. 33 is a perspective view of a beverage system according to an aspect of the present disclosure in a completely assembled form but without a housing.
FIG. 34 is a cross-section taken along line XXXV in FIG. 33 of the cooling/carbonation system shown in FIG. 33.
FIG. 35 is an exploded perspective view of the cooling/carbonation system of FIG. 33.
Figure 38:
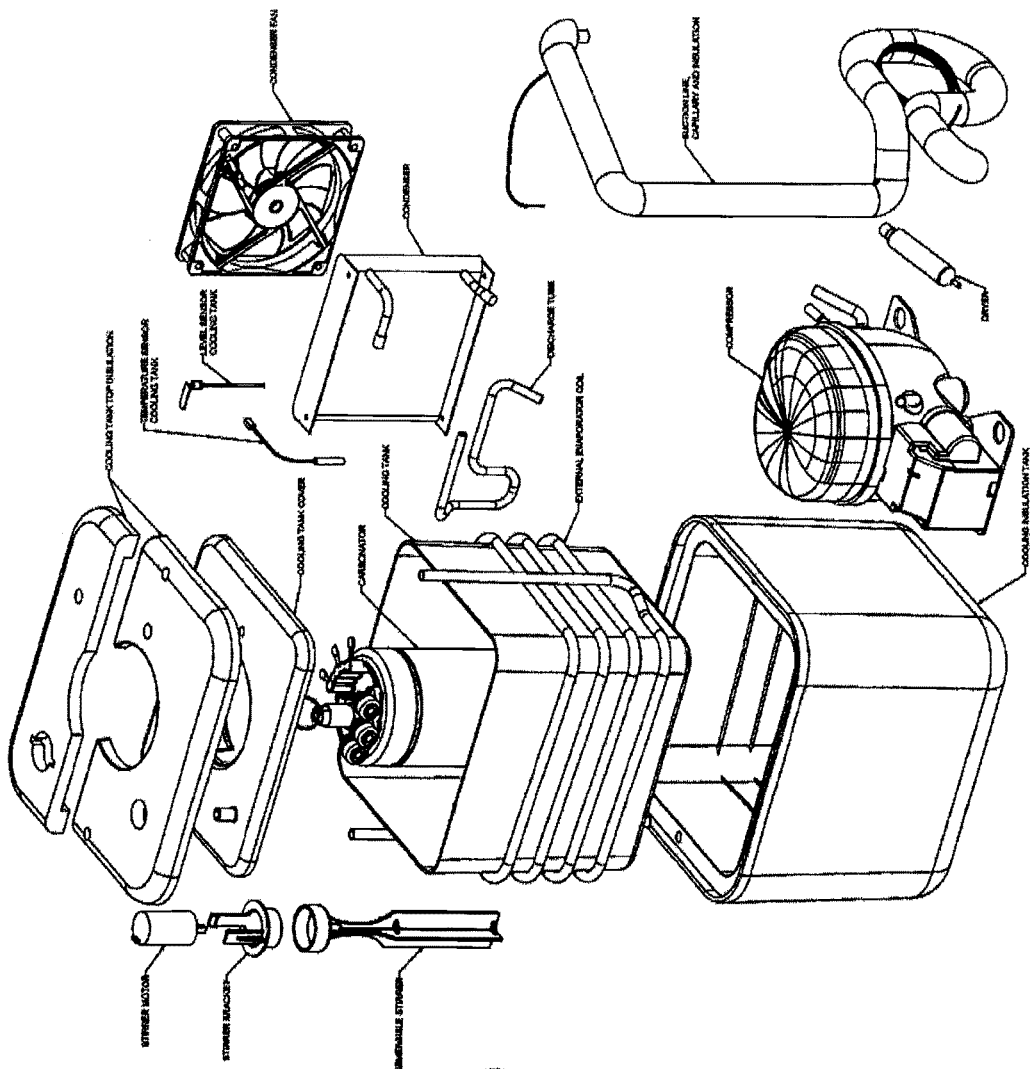
FIG. 38 is an exploded perspective view of the cooling/carbonation system of FIG. 36.
Figure 37:
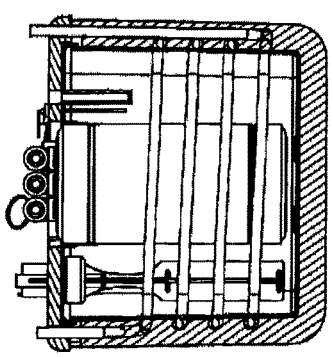
FIG. 37 is a cross-section taken along line XXXVIII in FIG. 36 of the cooling/carbonation system shown in FIG. 36.
Figure 36:
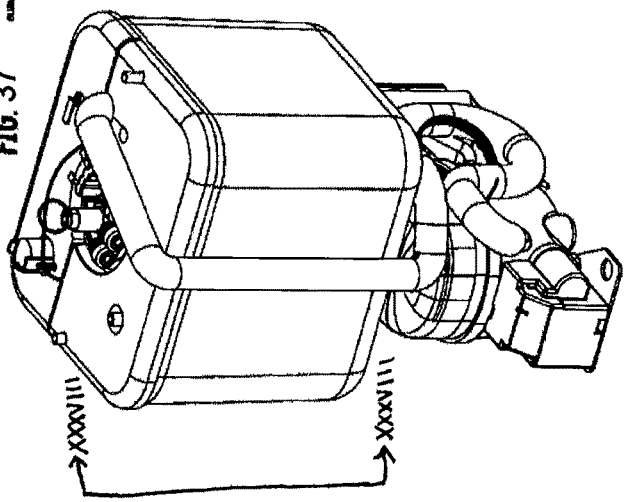
FIG. 36 is a perspective view of another embodiment of the cooling/carbonation system according to the present disclosure
Figures 39, 40, 41:
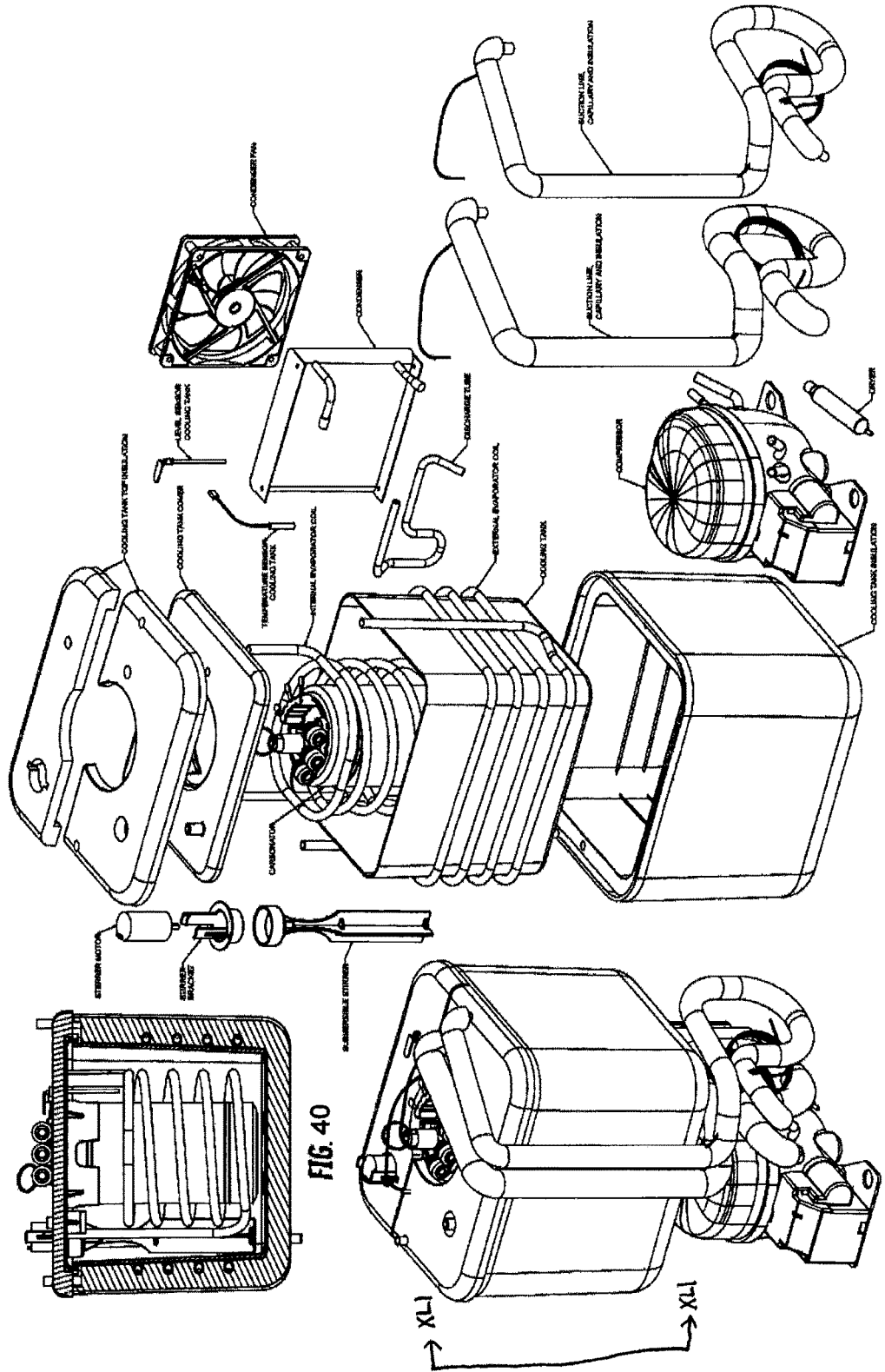
FIG. 39 is a perspective view of yet another embodiment of the cooling/carbonation system according to the present disclosure
FIG. 40 is a cross-section taken along line XLI in FIG. 39 of the cooling/carbonation system shown in FIG. 39.
FIG. 41 is an exploded perspective view of the cooling/carbonation system of FIG. 39.
Figure 43:
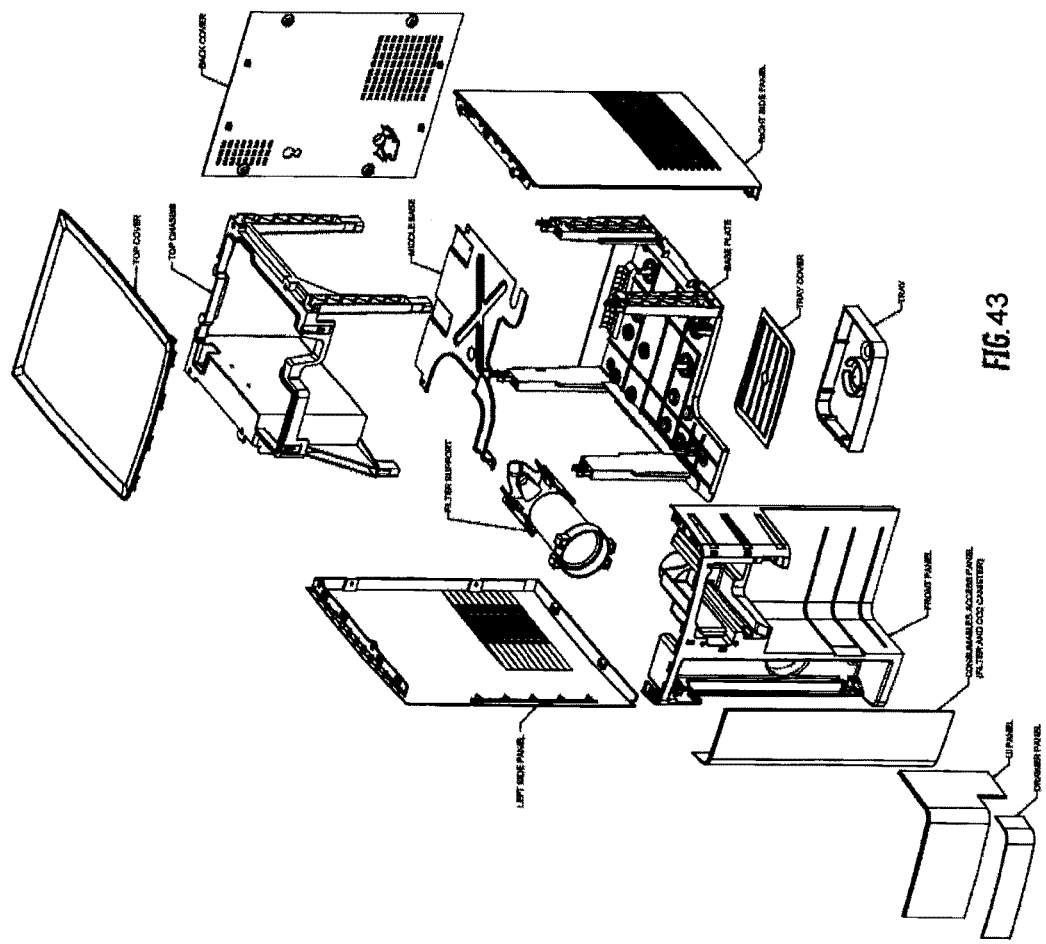
FIG. 43 is an exploded view of the exterior of the beverage system shown in FIG. 42.
Figure 42:
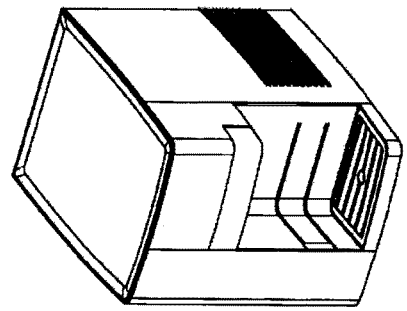
FIG. 42 is a perspective view of the exterior structure of a beverage system according to an aspect of the present disclosure.
Figure 45:
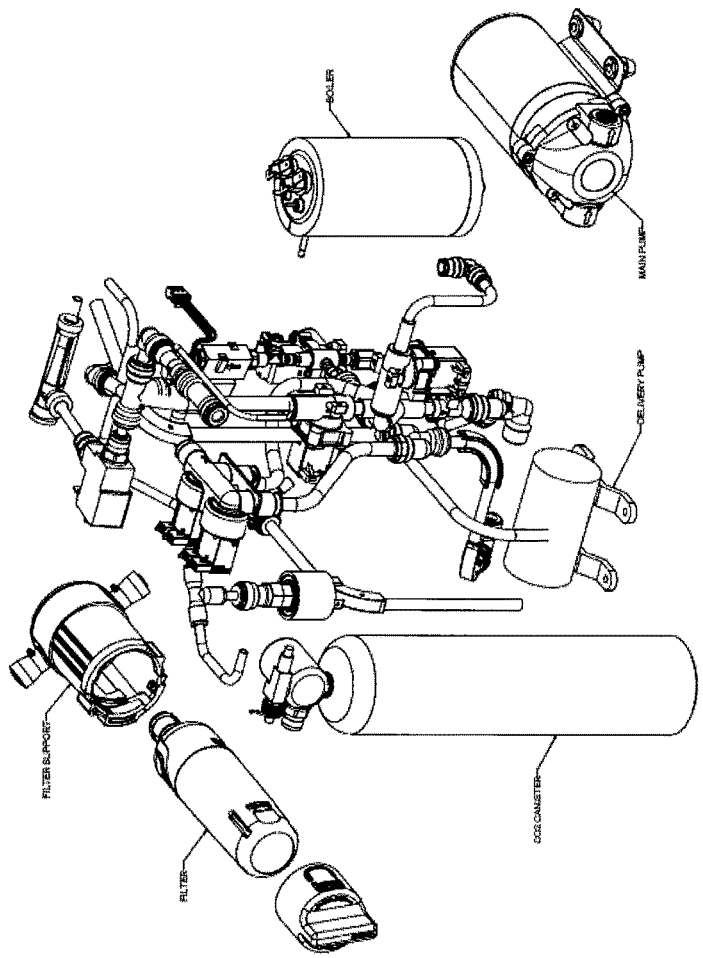
FIG. 45 is an exploded perspective view of the water pathway and water movement system shown in FIG. 44.
Figure 44:
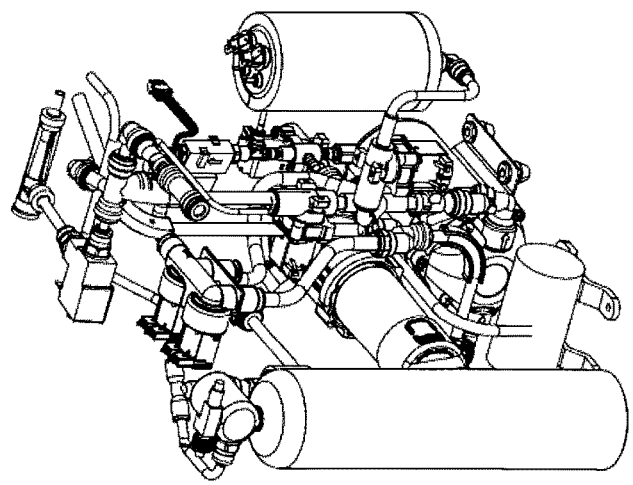
FIG. 44 is a perspective view of the water pathway and water movement system of a beverage system according to an aspect of the present disclosure.
Figure 46A:
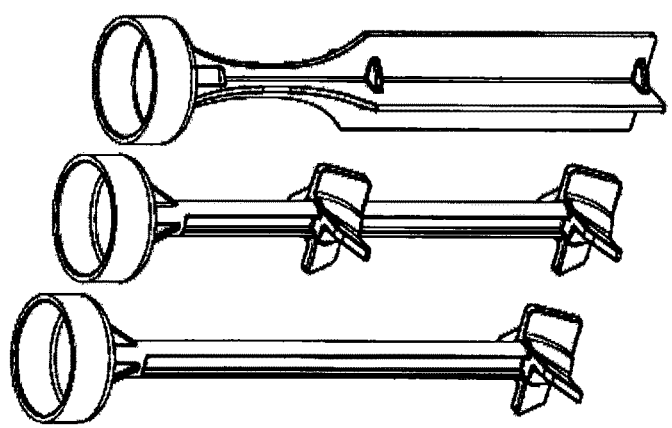
FIG. 46A is a perspective view of a three alternate embodiments of a submersible stirrers used in connection with the cooling/carbonation systems of the beverage machines according to an aspect of the present disclosure.
Figure 46B:
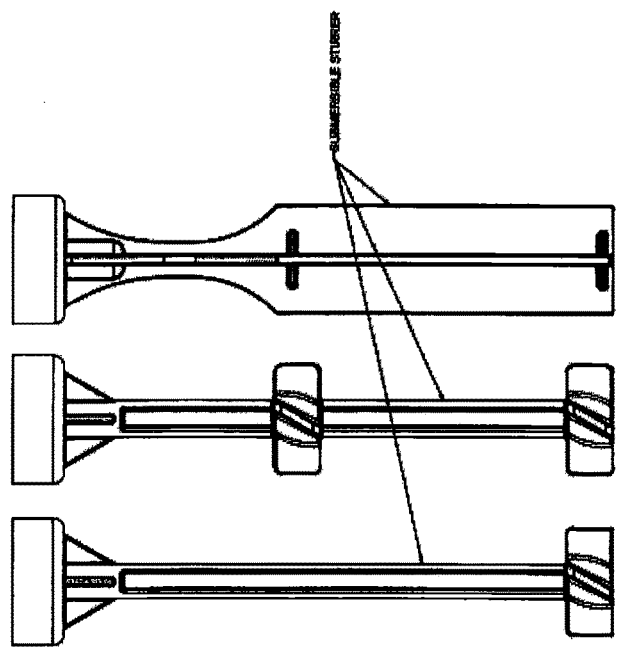
FIG. 46B is an elevated front view of the submersible stirrers used in connection with the cooling/carbonation systems of the beverage machines according to an aspect of the present disclosure.
Figure 46C:
FIG. 46C is a bottom end view of the submersible stirrers used in connection with the cooling/carbonation systems of the beverage machines according to an aspect of the present disclosure.
Figure 47:
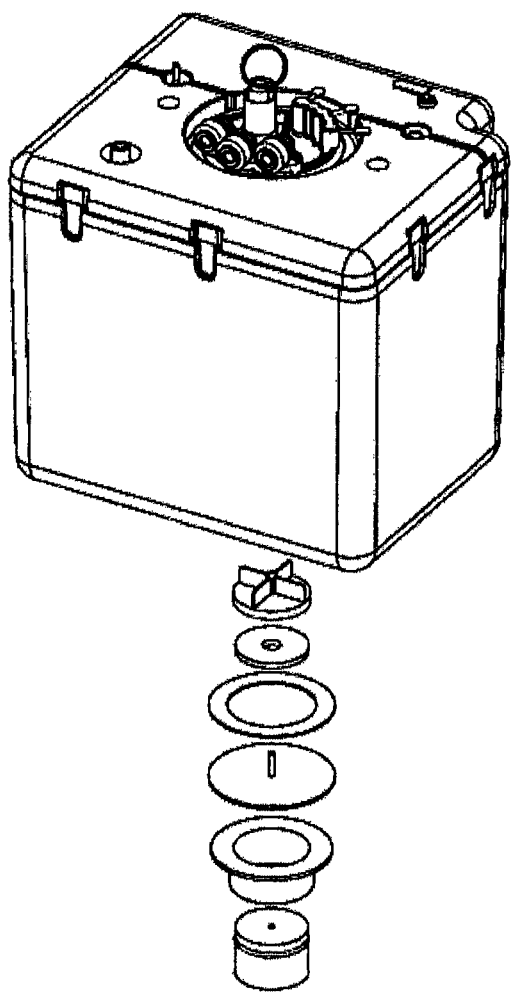
FIG. 47 is an exploded perspective view showing the magnetic mixer assembly of a carbonation/cooling chamber according to an aspect of the present disclosure.
Figure 49:
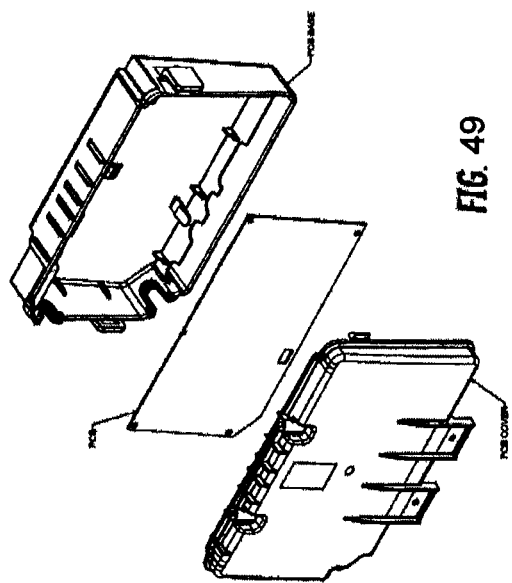
FIG. 49 is an exploded view of the control box assembly showing the interior of the printed circuit board and the exterior of the cover.
Figure 48:
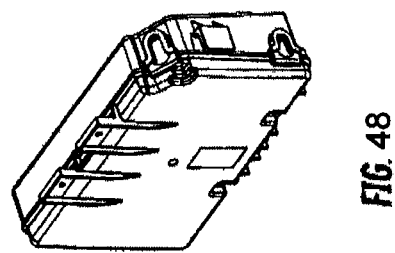
FIG. 48 is a perspective view of the control box assembly for containing a printed circuit board utilized in the beverage systems of the present disclosure.
Figure 52:
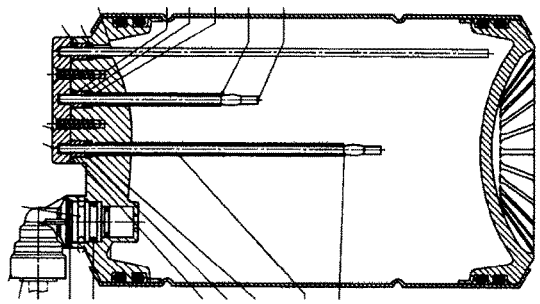
FIG. 52 is a cross-sectional view of the carbon dioxide inlet.
Figure 51:
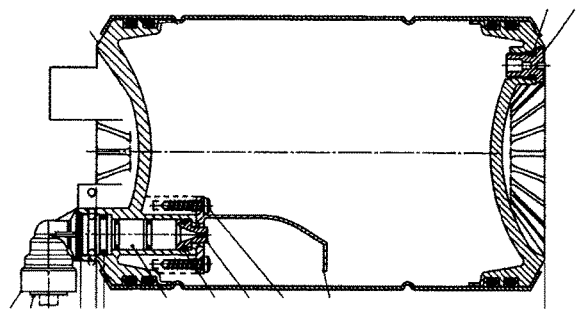
FIG. 51 is a cross-sectional view showing the water intake spray nozzle and rigid dispersing member that further disperses the water into the carbon dioxide in the carbonator.
Figure 53:
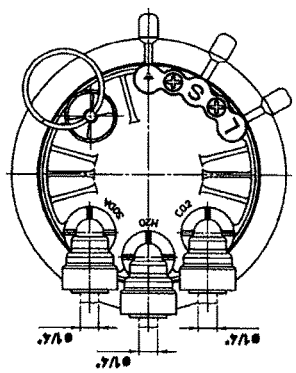
FIG. 53 is a top view showing the water and carbon dioxide inlets as well as the carbonated water outlet or the carbonator.
Figure 50:
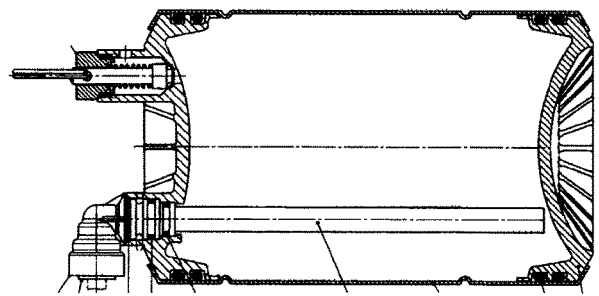
FIG. 50 is a cross-sectional view of the interior of the carbonator according to an aspect of the present disclosure showing the rigid conduit extending to substantially adjacent the bottom of the carbonator that pulls carbonated water from the bottom of the carbonator and out the outlet.

As shown in FIGS. 28-29, drawer open/close module 408 may connect to main frame 404 to facilitate automatic opening and closing of drawer assembly 402. Latch 490 may engage with drawer assembly frame 426 to lock drawer assembly 402 closed and to release drawer assembly 402 after the beverage is ready and piston pod mechanism 400 has completed a cycle and returned to safe operating state. First hole 492 and second hole 493 may be configured to fit over dowel pin 494. Tension spring 496 may also fit over dowel pin 494 between first hole 492 and second hole 493. Flat loop 498 of tension spring 496 may rest on a bottom side of latch 490 and L-shape portion 499 of tension spring 496 may fit into the U-shaped mouse hole 500 on drawer open/close module frame 502 such that between flat loop 498 and L-shape portion 499, tension spring 496 remains static unless latch 490 rotates. Tension spring 496 may then return latch 490 into a home position when no other force, typically an external, user activated force is acting on latch 490.

Frame 502 may connect to main frame 404 with screw(s) 504 or other fastening device or system. Slot 506 may provide a hole for a fourth microswitch 508. Trigger 510 may be depressed by latch arm 512 when latch 490 is in a home position. The latch may be rotated by rotation of eccentric cam 516, which may have cam slot 517 that may attach to second motor 518 via drive peg 519. Second motor 518 may attach to main frame 404 with screw(s) 502 and be configured to rotate eccentric cam 516.

Optical reader 530 may connect to main frame 404 such that lens 534 through front cover 532 may view an interior of piston pod mechanism 400. Housing 536 may attach to main frame with screw(s) (not shown) through eyelets 538. Light pipe 540 may connect to printed circuit board 542 and pass through light pipe slot 544 in housing 536 to provide light to lens 534. Back cover 546 may close the content of optical reader from the outside. Back cover 546 may attach to housing 534 with latch 548 on back cover 546, which engages with latch snap 550 on housing.

In operation, a user may load piston pod 300, 350 into removable insert 440 of drawer assembly 402. Removable insert 440 holds the pod in place. Spring loaded cup 450 keeps pod 300, 350 in place and prevent the bottom of pod 300, 350 from engaging with base 446. Standoff(s) 452 and track(s) 454 allows cup 450 to traverse up and down slightly. The user may remove removable insert 440 from drawer assembly 402 by pinching side tab(s) 458 and that portion of removable insert 440 will disengage from drawer assembly 402 for cleaning, part replacement, etc.

The user may then close drawer assembly 402 into main frame 404. Drawer assembly 402 induces latch 490 to open when pushed into main frame 404 and becomes prevented from opening when it passes under latch 490. A third microswitch 566 may detect the presence or absence of drawer assembly 402 and send a signal to a controller to turn on optical reader 530 when drawer assembly 402 is closed into main frame 404. Optical reader 530 may scan drawer assembly 402 and pod 300, 350 and sends a signal to controller 576 to identify the beverage selection based upon a code or image on the pod 300, 350.

First motor 412 may be energized by the controller and drives manifold assembly 416 downwards until it closes microswitch 564, signifying manifold assembly 416 is in an away position. Then, manifold assembly interface 460 may act as a bridge between pod 300, 350 and piston pod mechanism 400. First motor 412 may force manifold assembly 416 to clamp pod 300, 350 in position with compressive force such that inner gasket 482 and outer gasket 480 establish a seal between pod 300, 350 and piston pod mechanism 400. Manifold assembly interface 460 may make contact with the top of pod 300, 350 and water nozzle 474 may pierce top composite film 302, 352 thereby providing a channel between water nozzle 474 and center column 306. Similarly, air nozzle 484 may pierce top composite film 302, 352 providing a channel between recessed pocket 356 and air nozzle 484.

Manifold assembly 416 may travel downwards, causing manifold interface 460 to press outer gasket 480 and inner gasket 482 against pod 300, 350, forming an airtight seal between interface 460 and pod 300, 350. Further compression by manifold assembly 416 may cause capsule cap 310 to cave towards capsule body 303. Spikes 316 on capsule cap 310 may pierce bottom composite film 308 and create escape paths for concentrate inside of capsule body 303. Blowing air into pod 300, 350 may cause increased pressure inside capsule body 303 and may force concentrate out through channels created by spikes 316 in bottom composite film 308. Water flows from fluid feed line 568 through funnel 472 and water nozzle 474 through center column 306 of pod 300, 350. Water and concentrate mix in capsule cap 310 and beverage may flow out of piston pod mechanism 400.

When dispensing is complete, first motor 412 may be energized in reverse direction by the controller. Manifold interface 460 may disengage from capsule cap 310, causing capsule cap diaphragm to recoil back and returns to its original form. Manifold assembly 416 may retract until it returns to a "home" position. Manifold assembly 416 may trip first microswitch 562 closing the first microswitch 562 signifying manifold assembly 416 is in the home position.

When the dispensing sequence ends, the controller energizes second motor 518 releasing drawer assembly 402. Second motor 518 may turn eccentric cam 516 until latch 490 releases drawer assembly 402. Eccentric cam 516, driven by second motor 518, may start lifting latch 490 as eccentric cam 516 rotates. The eccentric profile of eccentric cam 516 enables second latch arm 514 to ride along eccentric cam 516 preventing latch 490 from hammering or suddenly opening or closing. Latch 490 rotates on dowel-pin 494 and slowly release drawer assembly 402. Drawer assembly compression spring 425 decompresses and pushes drawer assembly 402 away from drawer open/close module 408. The latch may continue riding along eccentric cam 516 for one full revolution. When drawer open/close module cycle is complete, first latch arm 512 may close and trigger 510 of fourth microswitch 508 signals to the controller to shut down second motor 518.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within the described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A beverage machine system comprising:
    an insulated potable liquid storage tank having an interior volume defined by one or more potable liquid retaining surfaces and retaining a chilled potable liquid within the interior volume at about ice bath temperature;
    a liquid carbonator spaced within the interior volume of the insulated potable liquid storage tank and submerged therein and wherein the liquid carbonator is in fluid communication with a pressurized carbon dioxide source tank via a carbon dioxide supply conduit;
    a high pressure potable liquid pump configured to pump potable liquid from the interior volume of the insulated potable liquid storage tank through a potable liquid conduit to a spray nozzle within an interior volume of the liquid carbonator such that carbon dioxide is supplied at a carbon dioxide pressure from the carbon dioxide tank and carbonation occurs as potable water is delivered to the interior of the liquid carbonator by utilizing the high pressure potable liquid pump and wherein the high pressure potable liquid pump delivers the potable liquid from the interior of the insulated potable liquid storage tank at a variable, but increasing pressure via the spray nozzle at a pressure greater than the carbon dioxide pressure throughout the process of carbonating the water in the liquid carbonator;
    a cooling coil positioned in a spaced apart relationship but wound around the liquid carbonator such that the cooling coil does not physically touch an exterior surface of the liquid carbonator submersed within the chilled potable liquid and an amount of space between the cooling coil and the liquid carbonator is at least substantially free of any other structure other than periodic frozen potable liquid adjacent the cooling coil; and
    a mechanical stirring device positioned within the interior volume of the insulated potable liquid storage tank and wherein carbon dioxide gas is constantly provided to the liquid carbonator from the carbon dioxide tank and wherein the liquid carbonator further comprises a carbonated water outlet positioned at the bottom of a rigid intake portion and extending upwardly from a position proximate a bottom of an interior of the liquid carbonator;
    wherein the stirring device is a motor driven magnetically coupled impeller assembly and wherein at least the bottom of the stirring device positioned within the interior volume of the insulated potable liquid storage tank has a plurality of radially outwardly extending and angled blades or a plurality of paddle surfaces.

2. The beverage machine system of claim 1, wherein a carbonated potable liquid produced within the liquid carbonator is substantially and constantly provided from an outlet of the liquid carbonator and regulated using a carbonated potable liquid water valve and thereafter a flow controller both positioned along a carbonated potable water delivery conduit between the carbonated water outlet and a beverage dispensing pod positioned within a pod receiving mechanism within the beverage machine system.

3. The beverage machine system of claim 1 further comprising a cooling subsystem that comprises a compressor, a condenser, a condenser fan associated with the condenser, a plurality of coolant conduits, and wherein the cooling coil is an evaporator coil in coolant fluid communication with the other components of the cooling subsystem.

4. The beverage machine system of claim 3, wherein the chilled potable liquid within the volume is chilled, filtered, uncarbonated water and the insulated potable liquid storage tank is hermetically sealed.

5. The beverage machine system of claim 3, wherein the insulated potable liquid storage tank includes an interior metal liner, insulative layer and exterior housing and wherein the cooling coil positioned in a spaced apart relationship but wound around the liquid carbonator is a first evaporator coil and wherein the beverage machine system further comprises a second evaporator coil engaged with the exterior surface of the interior metal liner of the insulated potable liquid storage tank and spaced between the interior metal liner and the exterior housing.

6. The beverage machine system of claim 3, wherein the compressor is a dual suction compressor where a first compressor suction inlet is operably connected via a first compressor suction inlet coolant conduit with a first evaporator and wherein a second compressor suction inlet is operable connected via a second compressor suction inlet coolant conduit with a second evaporator such that the compressor can regulate a cooling capacity balance between both the first evaporator and the second evaporator.

7. The beverage machine system of claim 1 further comprising a water filter positioned within the system and spaced within a housing of the system and wherein the system is either operably connected to a potable liquid source having enough natural pressure to deliver potable liquid through the filter and to the system or associated with a potable liquid delivery pump that provides the potable liquid at a pressure sufficient to deliver potable liquid through the filter and to the system.

8. The beverage machine system of claim 7, wherein the water filter further removes dissolved oxygen using a crystallized hydrated aluminosilicate made from 21% by weight of alumina hydrate Al(OH)3 and 68% to 72% sodium silicate Na2O 3.22-2.88 SiO2, which is mixed with 11% to 14% by weight sodium hydroxide NaOH in a 5% concentration and wherein the crystallized hydrated aluminosilicate has particle sizes of about five microns for about 75% of the material, and fifty microns for about 25% of the material.

9. The beverage machine system of claim 1, wherein the system is free of any thermal storage substance other than the potable liquid and wherein the about ice bath temperature is above the freezing point of the potable liquid within the interior volume of the potable liquid tank, but below about 33 degrees Fahrenheit and wherein the interior volume of the potable liquid tank is at a potable liquid pressure from a potable liquid source and wherein the potable liquid is provided from a pressurized municipal water source.

10. The beverage machine system of claim 1 further comprising a pod system that receives a single serve beverage pod and wherein the pod system and when the single serve beverage pod is in an engaged position within the pod system, the single serve beverage pod are each in fluid communication to receive one of: (1) filtered potable fluid at about ice bath temperature, (2) a carbonated potable fluid at about ice bath temperature, or (3) a filtered hot potable fluid.

11. A single serving beverage machine system comprising:
 an insulated potable liquid storage tank having an interior volume that receives and retains a chilled potable liquid within the interior volume at about ice bath temperature;
 a liquid carbonator spaced within the interior volume of the insulated potable liquid storage tank and submerged therein and wherein the liquid carbonator is in fluid communication with a pressurized carbon dioxide source tank via a carbon dioxide supply conduit;
 a high pressure potable liquid pump configured to pump potable liquid from the interior volume of the insulated potable liquid storage tank through a potable liquid conduit to a spray nozzle within an interior volume of the liquid carbonator such that carbon dioxide is supplied at a carbon dioxide pressure from the carbon dioxide tank and carbonation occurs as the chilled potable liquid is delivered to the interior of the liquid carbonator by utilizing the high pressure potable liquid pump and wherein the high pressure potable liquid pump delivers the chilled potable liquid from the interior of the insulated potable liquid storage tank at a variable, but increasing pressure via the spray nozzle at a pressure greater than the carbon dioxide pressure throughout the process of carbonating the chilled potable liquid in the liquid carbonator, resulting in a carbonated chilled potable liquid;
 a cooling subsystem comprising a compressor, a condenser, a condenser fan associated with the condenser, a plurality of coolant conduits, and an evaporator coil wherein each of the components of the cooling subsystem are in coolant fluid communication with the other components of the cooling subsystem; and wherein the evaporator coil is positioned in an offsettingly wound and spaced apart relationship with the liquid carbonator such that the evaporator coil does not physically touch an exterior surface of the liquid carbonator submersed within the chilled potable liquid and the space between the evaporator coil and the liquid carbonator is at least substantially free of any other structure other than periodic frozen potable liquid adjacent the evaporator coil;
 a pod receiving system that receives a single serving beverage pod having an identification system on the beverage pod such that a reading system of the beverage pod reads the identification system and the single serving beverage machine system selectively delivers at least one of a hot potable fluid, the chilled potable liquid, and the carbonated chilled potable liquid to the single serving beverage pod to produce a finished beverage for a user of the single serving beverage machine; and
 a mechanical stirring device positioned within the interior volume of the insulated potable liquid storage tank and wherein carbon dioxide gas is constantly provided to the liquid carbonator from the carbon dioxide tank and wherein the liquid carbonator further comprises a carbonated water outlet positioned at the bottom of a rigid intake portion and extending upwardly from a position proximate a bottom of an interior of the liquid carbonator;
 wherein the stirring device is a motor driven magnetically coupled impeller assembly and wherein at least the bottom of the stirring device positioned within the interior volume of the insulated potable liquid storage tank has a plurality of radially outwardly extending and angled blades or a plurality of paddle surfaces.

12. The single serving beverage machine system of claim 11, wherein a carbonated potable liquid produced within the liquid carbonator is substantially constantly provided from an outlet of the liquid carbonator and regulated using a carbonated potable liquid water valve and thereafter a flow controller both positioned along a carbonated potable water delivery conduit between the outlet of the liquid carbonator and a beverage dispensing pod positioned within a pod receiving mechanism within the single serving beverage machine system.

13. A beverage machine system comprising:
 an insulated potable liquid storage tank having an interior volume;
 a pressurized carbon dioxide source tank;
 a liquid carbonator disposed within the interior volume of the insulated potable liquid storage tank and in fluid communication with the pressurized carbon dioxide source tank via a carbon dioxide supply conduit;
 a spray nozzle;
 a high pressure pump configured to urge liquid from the carbonator to the spray nozzle; and
 a cooling coil free of physical contact from but wound around the carbonator;
 wherein carbon dioxide is supplied at a carbon dioxide pressure from the carbon dioxide tank and carbonation occurs at a time when the high pressure pump delivers potable water to the interior of the carbonator;
 wherein the high pressure pump delivers the potable liquid from the interior of the insulated potable liquid storage tank via the spray nozzle at a pressure greater than the carbon dioxide pressure throughout the process of carbonating the water in the liquid carbonator; and
 a cooling subsystem that comprises a compressor, a condenser, a condenser fan associated with the condenser, and a plurality of coolant conduits;
 wherein the cooling coil is an evaporator coil of a first evaporator in coolant fluid communication with the other components of the cooling subsystem;

wherein the compressor is a dual suction compressor having a first compressor suction inlet operably connected to the first evaporator via a first compressor suction inlet coolant conduit and a second compressor suction inlet operably connected to a second evaporator via a second compressor suction inlet coolant conduit; and wherein the compressor regulates a cooling capacity balance between both the first evaporator and the second evaporator.

14. The beverage machine system of claim 13 further comprising a mechanical stirring device positioned within the interior volume; and wherein carbon dioxide is constantly provided to the liquid carbonator from the carbon dioxide tank; and wherein the carbonator further comprises a carbonated water outlet positioned at the bottom of a rigid intake portion and extending upwardly from a position proximate a bottom of the carbonator.

* * * * *